United States Patent
Kamioka

(10) Patent No.: US 9,957,003 B2
(45) Date of Patent: May 1, 2018

(54) DESIRED ZMP TRAJECTORY GENERATING DEVICE FOR A MOBILE ROBOT

(71) Applicant: HONDA MOTOR CO., LTD., Tokyo (JP)

(72) Inventor: Takumi Kamioka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 15/206,413

(22) Filed: Jul. 11, 2016

(65) Prior Publication Data

US 2017/0036346 A1 Feb. 9, 2017

(30) Foreign Application Priority Data

Aug. 5, 2015 (JP) ................. 2015-155341

(51) Int. Cl.
*B62D 57/032* (2006.01)
(52) U.S. Cl.
CPC ........... *B62D 57/032* (2013.01); *Y10S 901/01* (2013.01)
(58) Field of Classification Search
CPC ........... B25J 9/10; B62D 57/032; G06F 17/18
USPC ........................................................ 700/245
See application file for complete search history.

(56) References Cited

U.S. PATENT DOCUMENTS

| 7,308,335 | B2 * | 12/2007 | Takenaka | B62D 57/02 318/568.1 |
| 7,313,463 | B2 * | 12/2007 | Herr | A61F 2/68 318/568.1 |
| 7,805,218 | B2 * | 9/2010 | Nagasaka | B62D 57/032 318/568.12 |
| 8,204,626 | B2 * | 6/2012 | Yoshiike | B62D 57/032 250/332 |
| 8,306,657 | B2 * | 11/2012 | Yoshiike | G06N 3/008 700/245 |
| 8,311,677 | B2 * | 11/2012 | Yoshiike | B62D 57/032 700/245 |

(Continued)

FOREIGN PATENT DOCUMENTS

JP      3726081      9/2005

OTHER PUBLICATIONS

Kensuke Harada et al., "Analytical Approach on Real-time Gait Planning for a Humanoid Robot", Journal of the Robotics Society of Japan, vol. 23 No. 6, pp. 752-760, 2005. English abstract included.

*Primary Examiner* — Jaime Figueroa
(74) *Attorney, Agent, or Firm* — Rankin, Hill & Clark LLP

(57) ABSTRACT

A device for generating a desired ZMP trajectory for a mobile robot includes a polynomial function coefficient group determining section (53a) which determines, by regarding the desired ZMP trajectory as a trajectory expressed by a polynomial function, a desired coefficient group composed of desired values of coefficients in respective terms of the polynomial function. The polynomial function coefficient group determining section uses a quadratic evaluation function including square values of the coefficients included in the desired coefficient group as variables and a plurality of constraint conditions each configured by a linear equality or linear inequality about the coefficients, to determine the desired coefficient group, by a solution method for a quadratic programming problem, in such a way as to minimize a value of the evaluation function while fulfilling the constraint conditions.

8 Claims, 7 Drawing Sheets

(56) References Cited

U.S. PATENT DOCUMENTS

| | | | |
|---|---|---|---|
| 9,415,506 B2* | 8/2016 | Kamioka | B25J 9/10 |
| 2005/0107916 A1* | 5/2005 | Nagasaka | B62D 57/02 700/245 |
| 2006/0173578 A1* | 8/2006 | Takenaka | B62D 57/032 700/245 |
| 2006/0247800 A1* | 11/2006 | Takenaka | B62D 57/032 700/54 |
| 2007/0016329 A1* | 1/2007 | Herr | A61F 2/68 700/250 |
| 2009/0271037 A1* | 10/2009 | Hong | B62D 57/032 700/253 |
| 2011/0022232 A1* | 1/2011 | Yoshiike | B62D 57/032 700/260 |
| 2011/0098860 A1* | 4/2011 | Yoshiike | B62D 57/032 700/260 |
| 2011/0301756 A1* | 12/2011 | Yoshiike | B62D 57/032 700/253 |
| 2015/0217447 A1* | 8/2015 | Kamioka | B25J 9/10 700/245 |

* cited by examiner

DESIRED POSITION/POSTURE TRAJECTORY OF FREE LEG'S FOOT

DESIRED ZMP TRAJECTORY GENERATING DEVICE FOR A MOBILE ROBOT

BACKGROUND OF THE INVENTION

Field of the Invention

The present invention relates to a device for generating a desired ZMP trajectory for a mobile robot.

Description of the Related Art

In the case of controlling movement of a mobile robot, it is conventionally a common practice to generate a desired ZMP trajectory which is a trajectory of a desired position (on a time axis) of a zero moment point (ZMP), and to generate a desired gait defining an operational target of each joint of the robot so as to fulfill the desired ZMP trajectory (as in, for example, Japanese Patent No. 3726081; hereinafter referred to as Patent Literature 1).

Further, a technique of generating a trajectory of the center of gravity of a robot using a desired ZMP trajectory expressed in the form of a polynomial function has been proposed in, for example, "Analytical Approach on Real-time Gait Planning for a Humanoid Robot", Kensuke Harada, Shuuji Kajita, Mitsuharu Morisawa, Fumio Kanehiro, Kiyoshi Fujiwara, Kenji Kaneko, and Hirohisa Hirukawa, Journal of the Robotics Society of Japan, Vol. 23 No. 6, pp. 752-760, 2005 (hereinafter, referred to as Non-Patent Literature 1).

SUMMARY OF THE INVENTION

In order for a desired ZMP trajectory to be generated so as to allow a mobile robot to move appropriately, the desired ZMP trajectory suffers a variety of constraints.

Such constraint conditions include: a constraint condition regarding the ZMP existence permissible region that the ZMP at a time in the desired ZMP trajectory must exist within a supporting polygon at that time; a constraint condition that it should be able to generate a desired gait that may keep the mobile robot in a stable state continuously, and so on.

For example, Patent Literature 1 mentioned above proposes a technique of generating a desired ZMP trajectory which can generate a desired gait that may keep the mobile robot in a stable state continuously (specifically, a desired gait that may converge to a normal gait), by setting a reference ZMP trajectory in the form of a polygonal line passing near the center of a supporting polygon and correcting the reference ZMP trajectory with a trapezoidal trajectory pattern.

With the conventional way of generating a desired ZMP trajectory as seen in Patent Literature 1, however, it was difficult to efficiently generate a desired ZMP trajectory that could simultaneously fulfill a plurality of constraint conditions regarding the desired ZMP trajectory. For example, with the technique described in Patent Literature 1, even in the case where a desired ZMP trajectory capable of generating a desired gait that may keep the mobile robot continuously in a stable state is generated through correction of a reference ZMP trajectory, the desired ZMP trajectory may not be able to fulfill the constraint condition regarding the ZMP existence permissible region. In such a case, the desired ZMP trajectory will have to be generated again.

Further, with the technique described in Patent Literature 1, the reference ZMP trajectory is corrected with a trapezoidal trajectory pattern. So, the region, within the supporting polygon, in which a desired position of the ZMP may be set would likely be restricted to a narrower region than the supporting polygon. As a result, the degree of freedom in setting of a desired position of the ZMP would likely be restricted and, thus, the degree of freedom of a desired gait that may be generated would likely be restricted.

Furthermore, with the technique described in Patent Literature 1, the desired ZMP trajectory is in the form of a polygonal line, which may impair smoothness in motion of the mobile robot near the times corresponding to the break points in the desired ZMP trajectory.

Although Non-Patent Literature 1 mentioned above describes that a desired ZMP trajectory is expressed by a polynomial function, it does not describe any technique of generating a desired ZMP trajectory, expressed by a polynomial function, so as to fulfill various constraint conditions.

In view of the foregoing, it is an object of the present invention to provide a desired ZMP trajectory generating device for a mobile robot that is able to efficiently and appropriately generate a desired ZMP trajectory that may fulfill various kinds of constraint conditions including the constraint condition regarding the existence permissible region of a desired ZMP.

To achieve the above object, the desired ZMP trajectory generating device for a mobile robot according to the present invention is a device for generating a desired ZMP trajectory as a trajectory of a desired position of a zero moment point (ZMP) of a mobile robot, the device including:

a polynomial function coefficient group determining section which determines, by regarding the desired ZMP trajectory as a trajectory expressed by a polynomial function of degree 2 or higher with time as a variable, a desired coefficient group comprising desired values of coefficients in respective terms of the polynomial function, wherein the polynomial function coefficient group determining section is configured to use a quadratic evaluation function configured to include square values of the coefficients included in the desired coefficient group as variables and a plurality of constraint conditions each configured by a linear equality or linear inequality about the coefficients, to determine the desired coefficient group, so as to minimize a value of the evaluation function while fulfilling the constraint conditions by a solution method for a quadratic programming problem, and the constraint conditions are configured to include a linear inequality which expresses a first constraint condition that a desired position of the ZMP at one or more sampling time in the desired ZMP trajectory exists within a predetermined polygonal region set in accordance with a desired position and desired posture of a floor-contacting site of the mobile robot at the sampling time (first aspect of the invention).

Here, the inventors of the present applicant have found the following through various studies. In the case of expressing a desired ZMP trajectory by a polynomial function of degree 2 or higher with time as a variable, determining a desired ZMP trajectory is equivalent to determining a desired coefficient group comprising desired values of coefficients in respective terms of the polynomial function expressing the desired ZMP trajectory.

Various constraint conditions regarding a desired ZMP trajectory, including the one regarding the existence permissible region of a desired ZMP, can each be expressed in the form of a linear inequality or linear equality about the coefficients in the respective terms of the polynomial function.

It should be noted that a linear equality is an equality which indicates that a linear combination of the coefficients in the polynomial function is equal to a certain constant value. A linear inequality is an inequality which indicates that a linear combination of the coefficients in the polynomial function is greater or smaller than a certain constant value.

By setting an appropriate quadratic evaluation function configured to include square values of the coefficients included in the desired coefficient group of the polynomial function as variables, it is possible to determine the desired coefficient group so as to minimize the value of the evaluation function, while fulfilling a constraint condition expressed by the linear inequality or linear equality, by applying a solution method for a quadratic programming problem.

In this case, with the solution method for a quadratic programming problem, two or more expressions can be used as the linear inequality or linear equality. It is thus possible to determine the desired coefficient group so as to be able to simultaneously fulfill two or more constraint conditions.

In particular, the constraint condition regarding the ZMP existence permissible region can be expressed as a condition that a desired position of the ZMP at at least one sampling time in the desired ZMP trajectory exists within a predetermined polygonal region which is set in accordance with a desired position and desired posture of a floor-contacting site of the mobile robot at the sampling time. In this case, the constraint condition can be expressed in the form of a linear inequality about the coefficients in the polynomial function.

It should be noted that the polygonal region at each sampling time is a region which agrees with, or is set within, a supporting polygon as a smallest convex region including the floor-contacting surface of the mobile robot at that sampling time.

For these reasons, in the present invention, the desired ZMP trajectory generating device for a mobile robot has been configured as in the first aspect of the invention.

According to the first aspect of the invention, it is possible to determine, by using a solution method for a quadratic programming problem, a desired coefficient group that fulfills a plurality of constraint conditions including a constraint condition (expressed by a linear inequality) regarding the ZMP existence permissible region. It is therefore possible to generate a desired ZMP trajectory, expressed by a polynomial function, so as to be able to fulfill the plurality of constraint conditions.

In this case, the polynomial function is a polynomial function of degree 2 or higher, so a desired ZMP trajectory can be generated in the form of either a straight line or a curve. It is thus possible to generate a desired ZMP trajectory in such a manner that the entire or almost entire region of the supporting polygon becomes a region in which a point on the desired ZMP trajectory can be set.

Therefore, according to the first aspect of the invention, it is possible to efficiently and appropriately generate a desired ZMP trajectory that may fulfill various kinds of constraint conditions including the constraint condition regarding the existence permissible region of a desired ZMP.

In the first aspect of the invention, the constraint conditions may include a variety of constraint conditions other than the above-described first constraint condition regarding the ZMP existence permission region, as long as the constraint condition can be expressed by a linear inequality or linear equality about the coefficients included in the desired coefficient group.

Specifically, in the first aspect of the invention, the constraint conditions may be configured to further include a linear equality which expresses, as a condition for keeping in a stable state an inverted pendulum mass point in a model that expresses a motion of a center of gravity of the mobile robot by a motion of the inverted pendulum mass point having a mass point at the center of gravity of the mobile robot and having a ZMP on the desired ZMP trajectory as a fulcrum, a second constraint condition that a motional state of the inverted pendulum mass point at a predetermined time in the future agrees with a predetermined motional state (second aspect of the invention).

That is, the second constraint condition can be expressed by a linear equality about the coefficients included in the desired coefficient group. Therefore, the constraint conditions can further include the second constraint condition. It is therefore possible to determine the desired coefficient group of the polynomial function, by the solution method for the quadratic programming problem, in such a manner that the desired ZMP trajectory expressed by the polynomial function may further fulfill the second constraint condition in addition to the aforesaid first constraint condition. Consequently, a desired ZMP trajectory suitable in generating a desired gait ensuring high stability of the center of gravity of the mobile robot can be generated.

In the second aspect of the invention, as the motional state of the inverted pendulum mass point at the predetermined time in the future, a motional state expressed by a linear combination of a position and a moving velocity of the inverted pendulum mass point, for example, can be adopted (third aspect of the invention).

It is therefore possible to express the second constraint condition as a linear equality.

Further, in the first through third aspects of the invention, the constraint conditions may be configured to further include a linear equality which expresses a third constraint condition that a desired position of the ZMP at a predetermined time on the desired ZMP trajectory agrees with a predetermined position (fourth aspect of the invention).

That is, the third constraint condition can be expressed by a linear equality about the coefficients included in the desired coefficient group. Therefore, the constraint conditions can further include the third constraint condition. It is therefore possible to determine the desired coefficient group of the polynomial function, by the solution method for the quadratic programming problem, in such a manner that the desired ZMP trajectory expressed by the polynomial function may further fulfill the third constraint condition in addition to the aforesaid first constraint condition. Consequently, a desired ZMP trajectory can be generated such that it becomes a trajectory that passes through a predetermined position at a predetermined time.

Further, in the first through fourth aspects of the invention, it is preferable that the desired ZMP trajectory is a trajectory which is divided into a plurality of sections of trajectory and expressed by polynomial functions specific to the respective sections, and that the desired coefficient group determined by the polynomial function coefficient group determining section comprises desired values of coefficients in respective terms of the polynomial functions for all of the plurality of sections (fifth aspect of the invention).

With this configuration, the desired ZMP trajectory can be expressed by individual polynomial functions corresponding respectively to the plurality of sections. This makes it possible to generate a desired ZMP trajectory in a variety of trajectory patterns. The desired ZMP trajectory can also be generated with sections separated at each switching of an operation pattern during the movement of the mobile robot, for example a switching timing of the number of floor-contacting sites (such as feet) of the mobile robot, a landing timing of a floor-contact site of the mobile robot, or the like.

In the fifth aspect of the invention, the constraint conditions may be configured to further include a linear equality which expresses a fourth constraint condition that, of two arbitrary sections adjacent to each other among the plurality of sections, a position of the ZMP at an ending time of a preceding section defined by the polynomial function for the preceding section and a differential value of a predetermined order of that position of the ZMP agree with a position of the ZMP at a starting time of a succeeding section defined by the polynomial function for the succeeding section and a differential value of the predetermined order of that position of the ZMP, respectively (sixth aspect of the invention).

It should be noted that the "differential value of a predetermined order of the position of the ZMP" means a moving velocity of the ZMP (first order differential value), a moving acceleration thereof (second order differential value), a third order differential value, and the like. The differential value of the predetermined order may include a plurality of differential values of different orders from each other.

Of the fourth constraint condition, the condition regarding the position of the ZMP and the condition regarding the differential value of a predetermined order of the position of the ZMP can each be expressed by a linear equality about the coefficients included in the desired coefficient group. Therefore, the constraint conditions can further include the fourth constraint condition. It is therefore possible to generate a desired ZMP trajectory composed of the desired ZMP trajectories of the respective sections, in such a manner that the desired ZMP trajectories in the respective sections continue smoothly in terms of all of the positions of the ZMPs and the differential values of a predetermined order of the positions of the ZMPs. Consequently, a desired ZMP trajectory suitable in generating a desired gait ensuring smooth movement of the mobile robot can be generated.

In the fifth or sixth aspect of the invention, it is preferable that the polynomial function for a respective one of the plurality of sections is a polynomial function which is expressed as a function of time obtained by normalizing the time in the corresponding section by regarding a time width of the section as a predetermined constant value and by regarding a starting time of the section as zero (seventh aspect of the invention).

With this configuration, the times in the respective sections can be expressed as times normalized in the form common to the plurality of sections. Accordingly, the linear equalities or linear inequalities expressing the aforesaid constraint conditions or the aforesaid evaluation function can be expressed in a simplified form.

In the first through seventh aspects of the invention, as the evaluation function, a variety of functions may be adopted, as long as it is a quadratic function configured to include, as variables, square values of the coefficients included in the desired coefficient group.

For example, as the evaluation function, a function which expresses an integral of a square value of a moving acceleration of the ZMP in the desired ZMP trajectory may be adopted (eighth aspect of the invention).

Here, the moving acceleration of the ZMP corresponds to a second order differential value of the position of the ZMP. Therefore, when the desired ZMP trajectory is expressed by a polynomial function, the moving acceleration of the ZMP in the desired ZMP trajectory is also expressed by a polynomial function. Thus, the integral of the square value of the moving acceleration becomes a quadratic function configured to include square values of the coefficients included in the desired coefficient group as variables. Accordingly, the function expressing an integral of a square value of a moving acceleration of the ZMP can be adopted as the aforesaid evaluation function.

Then, in the case where the function expressing an integral of a square value of a moving acceleration of the ZMP is adopted as the evaluation function, the desired coefficient group is determined, by a solution method for a quadratic programming problem, so as to minimize the integral of the square value of the moving acceleration of the ZMP.

This can prevent a desired ZMP trajectory from being generated in the form causing an abrupt change of the moving velocity of the ZMP in the desired ZMP trajectory. It is thus possible to generate a desired ZMP trajectory which is smooth, such that a desired gait ensuring smooth movement of the mobile robot can be generated.

BRIEF DESCRIPTION OF THE DRAWINGS

FIG. 7A and FIG. 7B show examples of a supporting polygon, in which FIG. 7A shows the supporting polygon during a one-leg supporting period, and FIG. 7B shows the supporting polygon during a two-leg supporting period;

DESCRIPTION OF THE PREFERRED EMBODIMENTS

Figure 1:
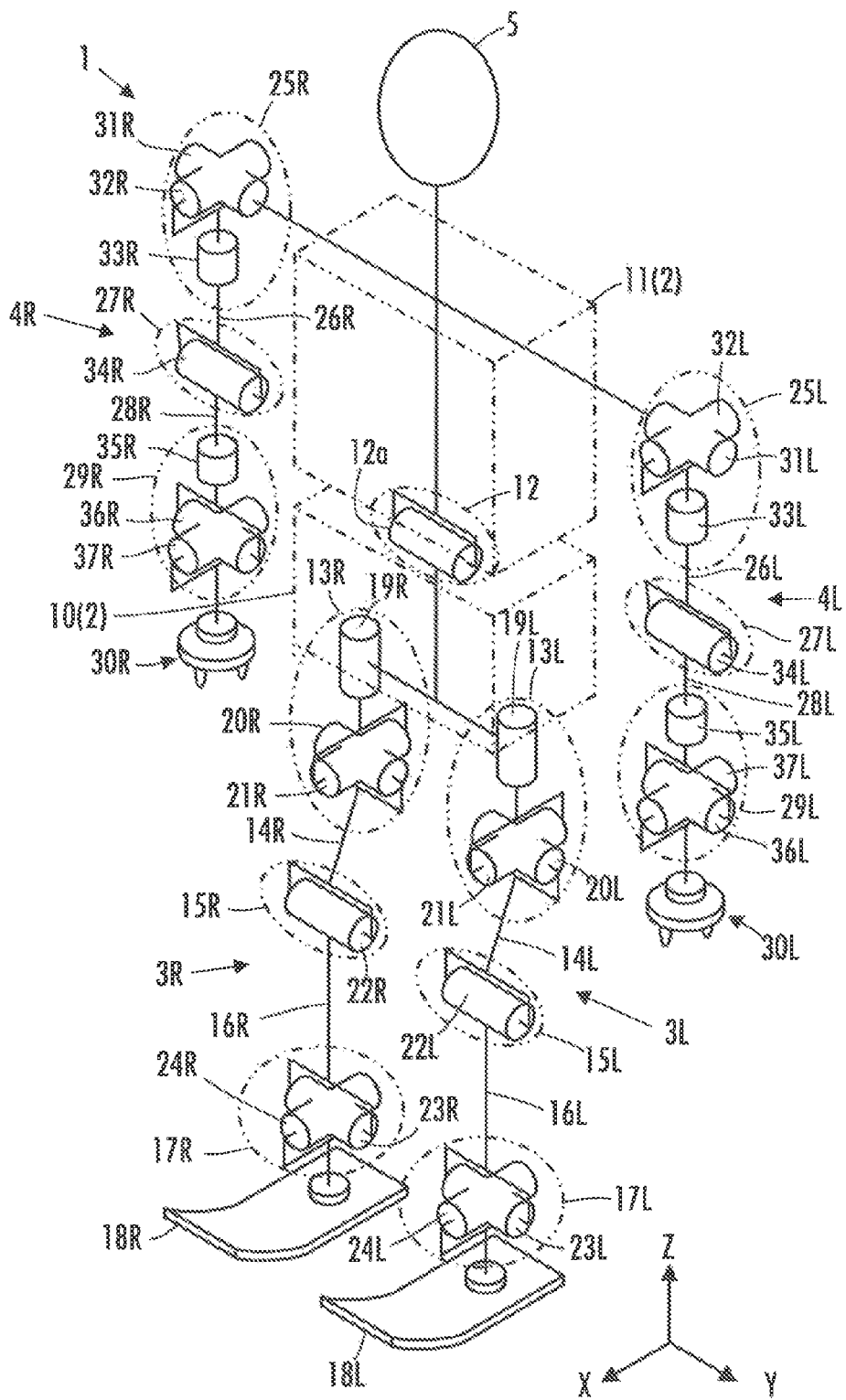
FIG. 1 shows a configuration of a mobile robot in an embodiment of the present invention.

An embodiment of the present invention will be described below with reference to FIGS. 1 to 9. FIG. 1 schematically shows the general configuration of a mobile robot given as an example in the present embodiment. This mobile robot 1 (hereinafter, referred to simply as the robot 1) is a humanoid, legged mobile robot which has a body 2, a plurality of (in the present embodiment, four) movable link mechanisms 3R, 3L, 4R, and 4L extended from the body 2, and a head 5.

Of the four movable link mechanisms 3R, 3L, 4R, and 4L, the movable link mechanisms 3R and 3L are link mechanisms corresponding to a pair of right and left leg link mechanisms, and the movable link mechanisms 4R and 4L are link mechanisms corresponding to a pair of right and left arm link mechanisms.

It should be noted that "R" and "L" included in the reference characters shown in the figure indicate the constituent elements on the right side and on the left side, respectively, of the robot 1. In the following description, however, the symbols "R" and "L" will be omitted when it is unnecessary to distinguish between the right and the left. Further, the movable link mechanisms 3R and 3L may be referred to as the leg link mechanisms 3R and 3L (or as the leg link mechanism 3), and the movable link mechanisms 4R and 4L may be referred to as the arm link mechanisms 4R and 4L (or as the arm link mechanism 4).

Further, in the following description of the present embodiment, the yaw, pitch, and roll directions mean directions about an axis in an up-and-down direction (Z axis in FIG. 1), an axis in a right-and-left direction (Y axis in FIG. 1), and an axis in a front-and-back direction (X axis in FIG. 1), respectively, of the robot 1 in the state where the robot 1 is standing in an upright posture as shown in FIG. 1 (in the state where the body 2 and the movable link mechanisms 3R, 3L, 4R, and 4L extend approximately in the up-and-down direction). The X, Y, and Z axes shown in FIG. 1 are the coordinate axes of a three-axis orthogonal coordinate system.

The body 2 is a link mechanism corresponding to the upper body of the robot 1. In the present embodiment, the body 2 is composed of two element links of a lower body 10 and an upper body 11 arranged above the lower body 10, and a joint mechanism 12 joining the lower body 10 and the upper body 11. In the robot 1 illustrated, the joint mechanism 12 is configured with a joint 12a having a degree of freedom of rotation in the pitch direction (about the Y axis), for example.

Of the movable link mechanisms 3R, 3L, 4R, and 4L, the leg link mechanisms 3R and 3L share the same construction. More specifically, each leg link mechanism 3 includes the following element links as its constituent elements: a thigh 14 which is joined to the lower body 10 through the intermediary of a hip joint mechanism 13, a crus 16 which is joined to the thigh 14 through the intermediary of a knee joint mechanism 15, and a foot 18 which is joined to the crus 16 through the intermediary of an ankle joint mechanism 17. The foot 18 is an element link constituting the distal portion of the leg link mechanism 3.

In the robot 1 illustrated, the hip joint mechanism 13 is made up of three joints 19, 20, and 21 having degrees of freedom of rotation in the yaw direction (about the Z axis), the pitch direction (about the Y axis), and the roll direction (about the X axis), respectively. The knee joint mechanism 15 is made up of a joint 22 having a degree of freedom of rotation in the pitch direction. The ankle joint mechanism 17 is made up of two joints 23 and 24 having degrees of freedom of rotation in the pitch direction and the roll direction, respectively.

Therefore, in the present embodiment, each leg link mechanism 3 is configured such that its distal portion (foot 18) has six degrees of freedom of motion with respect to the lower body 10.

Of the movable link mechanisms 3R, 3L, 4R, and 4L, the arm link mechanisms 4R and 4L share the same construction. More specifically, each arm link mechanism 4 includes the following element links as its constituent elements: an upper arm 26 which is joined to the upper body 11 through the intermediary of a shoulder joint mechanism 25, a forearm 28 which is joined to the upper arm 26 through the intermediary of an elbow joint mechanism 27, and a hand 30 which is joined to the forearm 28 through the intermediary of a wrist joint mechanism 29. The hand 30 is an element link constituting the distal portion of the arm link mechanism 4.

In the robot 1 illustrated, the shoulder joint mechanism 25 is made up of three joints 31, 32, and 33 having degrees of freedom of rotation in the pitch, roll, and yaw directions, respectively. The elbow joint mechanism 27 is made up of a joint 34 having a degree of freedom of rotation in the pitch (or roll) direction. The wrist joint mechanism 29 is made up of three joints 35, 36, and 37 having degrees of freedom of rotation in the yaw, pitch, and roll directions, respectively.

Therefore, in the present embodiment, each arm link mechanism 4 is configured such that its distal portion (hand 30) has seven degrees of freedom of motion with respect to the upper body 11.

It should be noted that the hand 30 may also include an open/close mechanism for a work by the hand 30, or a plurality of bendable and stretchable finger mechanisms.

The head 5 is arranged on top of, and fixedly secured to, the upper body 11. The head 5, however, may be joined to the upper body 11 through the intermediary of a joint mechanism so that it can perform a tilting or panning operation, for example.

The above has outlined the mechanical structure of the robot 1 of the present embodiment. The robot 1 with such a structure can travel basically through operations of the right and left leg link mechanisms 3R and 3L (through the operation in biped gait in which the feet 18 each move in the air and then come into contact with the floor repeatedly).

Alternatively, the arm link mechanisms 4R, 4L can be operated as leg link mechanisms besides the leg link mechanisms 3R, 3L for traveling of the robot 1. For example, the robot 1 can also travel through the operation in quadruped gait in which the distal portions (feet 18 and hands 30) of the four movable link mechanisms of leg link mechanisms 3R, 3L and arm link mechanisms 4R, 4L each move in the air and then come into contact with the floor repeatedly.

Supplementally, each leg link mechanism 3 may be configured to have more than six degrees of freedom of motion, for example. Further, each arm link mechanism 4 may be configured to have less than seven degrees of freedom of motion, or more than seven degrees of freedom of motion, for example.

Further, the joint mechanism 12 of the body 2 may be configured with a joint having a degree of freedom of rotation in the roll or yaw direction. Alternatively, the joint mechanism 12 may be configured to have more than one degree of freedom of motion. Still alternatively, the body 2 may be configured as one piece (with the lower body 10 and the upper body 11 integrated), without the joint mechanism 12.

The joints in each leg link mechanism 3 and each arm link mechanism 4 are not limited to the rotary joints; they may include prismatic joints.

The robot 1 may have a structure including no head 5, or a structure including only one or neither one of the arm link mechanisms 4R, 4L.

Further, the robot 1 may have three or more leg link mechanisms. In the case where the arm link mechanisms 4R, 4L are operated as the leg link mechanisms in addition to the leg link mechanisms 3R, 3L for traveling of the robot 1, the robot 1 may be considered as a robot which has essentially four leg link mechanisms.

Figure 2:
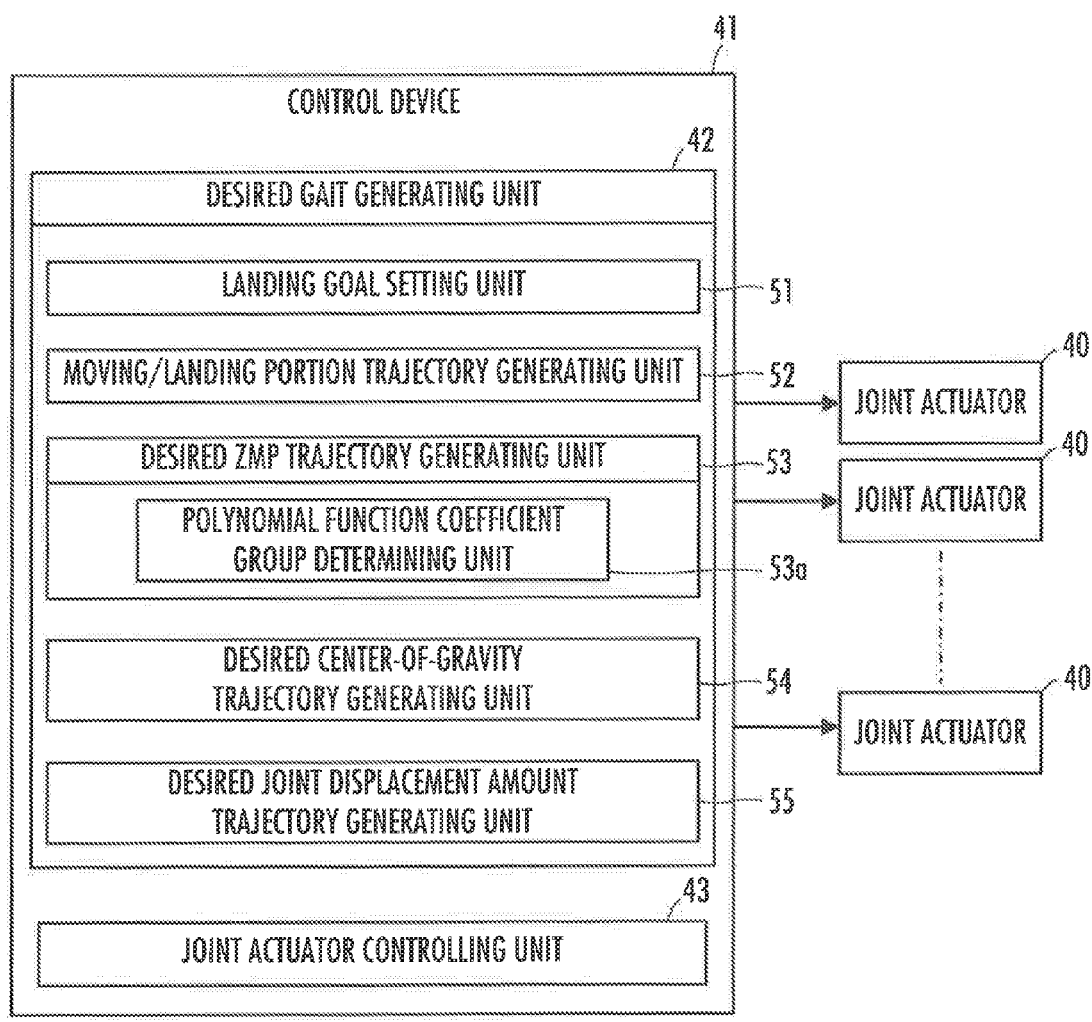
FIG. 2 is a block diagram showing the functions of a control device of the mobile robot.

Although not shown in FIG. 1, the robot 1 includes, as shown in FIG. 2, joint actuators 40 which rotatively drive the corresponding ones of the above-described joints, and a control device 41 which performs operation control of the robot 1.

The joint actuator 40, provided for each joint, is made up of an electric motor or a hydraulic actuator, for example. In this case, the drive mechanism of each joint by the joint actuator 40 may have a construction known in the art. Further, the joint actuator 40 is not limited to the rotary actuator; it may be a linear actuator.

The control device 41 is an electronic circuit unit including a CPU, RAM, ROM, interface circuit, and so on. The control device 41 includes, as major functions implemented by installed programs and hardware configuration, a desired gait generating unit 42 which generates a desired gait (operational goal for the robot 1) as a controlling desired value for the operation control of each joint of the robot 1, and a joint actuator controlling unit 43 which controls each joint actuator 40 of the robot 1 in accordance with the desired gait.

The desired gait generating unit 42 includes: a landing goal setting unit 51 which sets, for each site (foot 18 or hand 30) (hereinafter, "moving/landing portion") of the robot 1 caused to move in the air and then land on (or come into contact with) the floor during the movement of the robot 1, goals of its position and posture (hereinafter, referred to as "desired landing position/posture") at a planned landing location and a goal of its landing time (hereinafter, referred to as "desired landing time") at that planned landing location; a moving/landing portion trajectory generating unit 52 which generates a trajectory of desired position and desired posture in the movement operation of each moving/landing portion; a desired ZMP trajectory generating unit 53 which generates a desired ZMP trajectory as a trajectory of a desired position of the zero moment point (ZMP) (hereinafter, this position may be referred to as "desired ZMP"); a desired center-of-gravity trajectory generating unit 54 which generates a desired center-of-gravity trajectory as a trajectory of a desired position of the overall center of gravity of the robot 1; and a desired joint displacement amount trajectory generating unit 55 which generates a trajectory of a desired joint displacement amount as a desired value of the displacement amount of each joint of the robot 1.

To give supplemental explanation about the terms used herein, the "position" of a given site, such as a foot 18, of the robot 1 means the spatial position of a representative point of the site (point fixed with respect to the site), and the "posture" of a given site means the spatial orientation of the site.

Further, the "position/posture" means a set of "position" and "posture". The "desired position/posture" means a set of "desired position" and "desired posture". Further, the "trajectory" means one which is expressed as a time series of instantaneous values, or as a function of time.

It should be noted that the "position" and "posture" of a given site of the robot 1 are described as the position and posture observed in a global coordinate system (world coordinate system) which is arbitrarily designed and set with respect to the operating environment of the robot 1.

Further, the ZMP is a point on a floor surface at which a component in a horizontal direction (component about a horizontal axis) of a moment generated about the ZMP due to the resultant force of the gravitational force acting on the robot 1 and the inertial force generated by the motion of the entire robot 1 becomes zero. It should be noted that the "floor surface" is not limited to the floor surfaces (indoors) in the normal meaning; it also includes any contact surfaces, including the ground and road surfaces, with which the moving/landing portion may be brought into contact.

Specific processing performed by the control device 41 will now be described, by giving as an example the case where the robot 1 moves in a biped gait operation in which the feet 18 of the leg link mechanisms 3R and 3L each move in the air and then land on the floor repeatedly.

The biped gait is a gait for the robot 1 to travel by moving the feet 18R and 18L of the leg link mechanisms 3R and 3L in a manner similar to that in the human walking operation. More specifically, the biped gait is a gait in which a one-leg supporting period and a two-leg supporting period are repeated alternately. In the one-leg supporting period, with a foot 18 of one of the leg link mechanisms 3R, 3L (as a supporting leg) being in contact with the floor (in the state of receiving contact reaction force from the floor surface), the foot 18 of the other leg link mechanism (as a free leg) moves in the air and then lands on the floor. In the two-leg supporting period, the feet 18R, 18L of both leg link mechanisms 3R, 3L are in contact with the floor. In this case, the leg link mechanism as a supporting leg and the leg link mechanism as a free leg in the one-leg supporting period are changed alternately between the right leg link mechanism 3R and the left leg link mechanism 3L each time the one-leg supporting period is repeated. The feet 18R and 18L each correspond to the aforesaid moving/landing portion.

In the following description, as a global coordinate system for describing the position and posture of a given site, such as a foot 18, of the robot 1 or for describing the position of the ZMP or the center of gravity of the robot 1, a three-axis orthogonal coordinate system having two horizontal axes of X axis and Y axis and a vertical axis of Z axis will be used. In this case, as shown in FIG. 1, the X axis corresponds to the horizontal axis in the longitudinal (front-and-back) direction of the robot 1, and the Y axis corresponds to the horizontal axis in the lateral (right-and-left) direction of the robot 1.

The desired gait generating unit 42 of the control device 41 carries out the processing in the landing goal setting unit 51 before initiation of movement of the robot 1, or at an appropriate timing during the movement (for example, each time the robot 1 moves a predetermined number of steps). The landing goal setting unit 51 sets a desired landing position/posture and a desired landing time for a foot 18 of a leg link mechanism 3 as a free leg, for each step up to the N-th step (where N is an integer not smaller than 2).

It should be noted that one "step" means an operation of a foot 18 of a leg link mechanism 3 (3R or 3L) of moving in the air and then landing on the floor.

Figure 3:
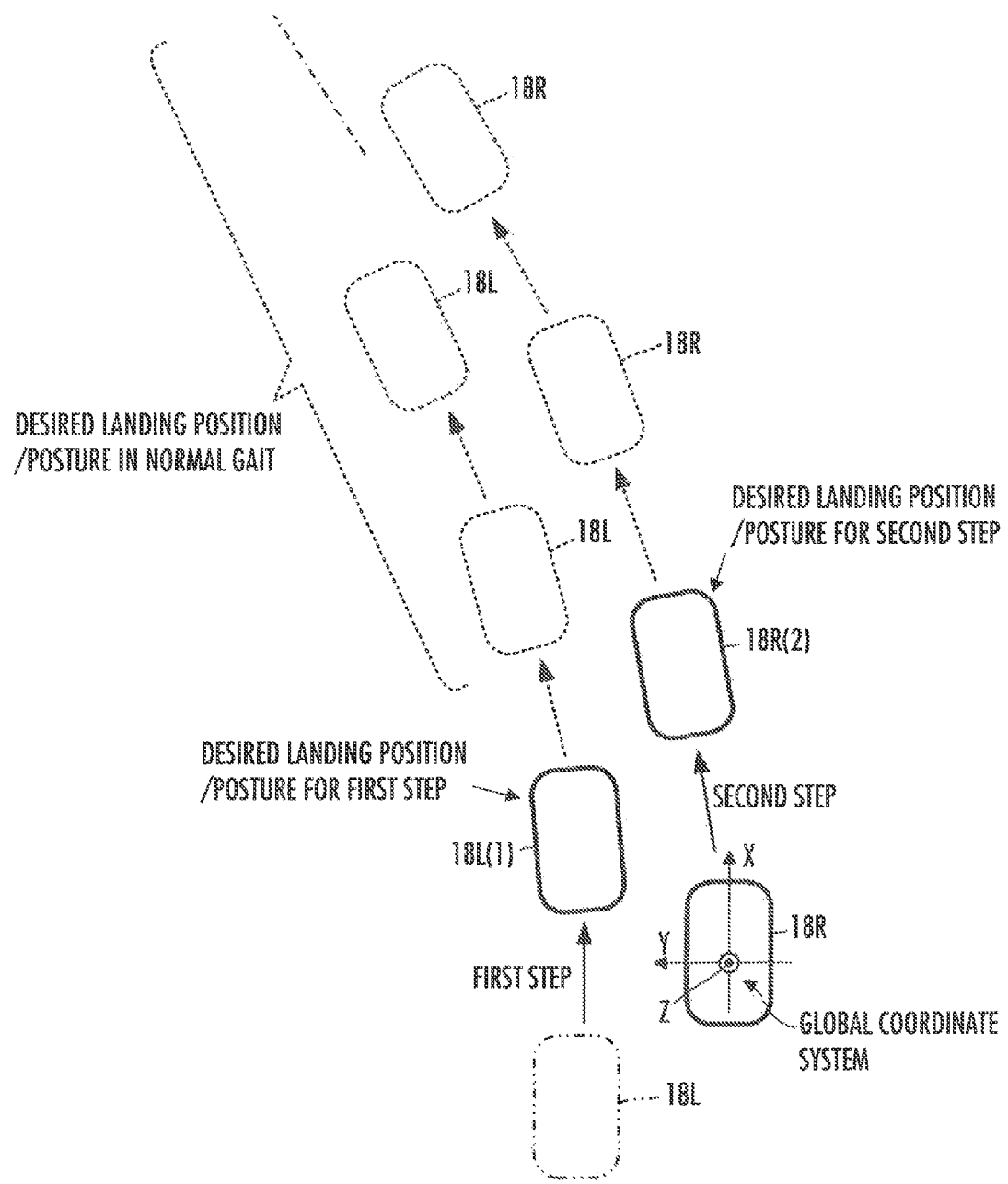
FIG. 3 shows, by way of example, desired landing positions and desired landing postures of the feet at the time of movement of the mobile robot.

FIG. 3 shows, by way of example, the state where desired landing positions/postures (as seen from above) of the feet 18 up to the second step have been set, with the free leg and the supporting leg in the first step being the left leg link mechanism 3L and the right leg link mechanism 3R, respectively, and the free leg and the supporting leg in the second step being the right leg link mechanism 3R and the left leg link mechanism 3L, respectively. In this case, the foot 18L(1) shown by the solid line illustrates the desired landing position/posture of the foot 18L of the free leg for the first step, and the foot 18R(2) shown by the solid line illustrates the desired landing position/posture of the foot 18R of the free leg for the second step.

In the case where the geometry of the floor surface in the operating environment of the robot 1 has been found in advance, the desired landing positions/postures and the desired landing times set in the landing goal setting unit 51 may be created in advance before the robot 1 starts moving. In the case where the robot 1 travels while measuring the geometry of the floor surface around the robot 1 using an external field sensor or other equipment mounted on the robot 1, the desired landing positions/postures and the desired landing times set in the landing goal setting unit 51 may be updated at any time (for example, each time the robot 1 moves one step).

Next, the desired gait generating unit 42 of the control device 41 carries out, by the moving/landing portion trajectory generating unit 52, the processing of generating a desired position/posture trajectory of each foot 18 by using the desired landing positions/postures and the desired landing times of the feet 18 set in the landing goal setting unit 51.

Here, in the present embodiment, the desired gait generating unit 42 of the control device 41 generates, for example at each movement by one step of the robot 1, a desired gait (desired position/posture trajectory of each foot 18 etc.) of the robot 1 for a period of up to a predetermined number of steps in the future.

Thus, at each movement by one step of the robot 1, the moving/landing portion trajectory generating unit 52 generates a desired position/posture trajectory for each foot 18 for a period of up to a predetermined number of future steps, for example up to the second step, by using the desired landing positions/postures and the desired landing times of the feet 18 set in the landing goal setting unit 51.

Figure 4:
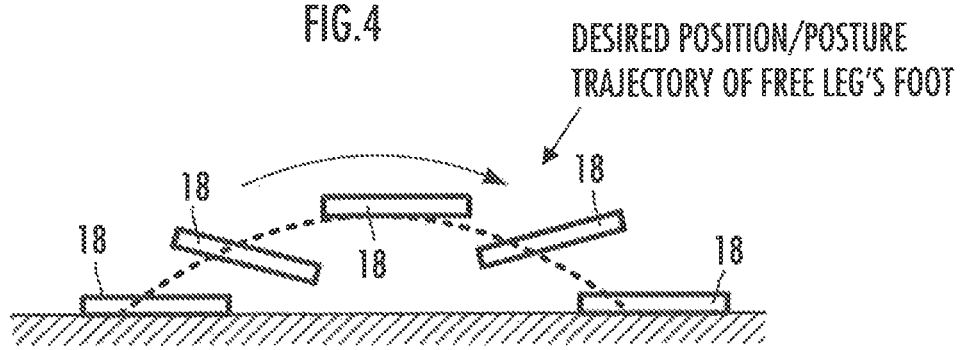
FIG. 4 shows, by way of example, a trajectory of desired position and desired posture of a foot.

In this case, for the foot 18 of a leg link mechanism 3 as a free leg in each step up to the second step, a desired position/posture trajectory of the foot 18 is generated in such a manner that the position and posture of the foot 18 will change as illustrated in FIG. 4, for example.

In the illustrated example, it is configured such that the position and the posture of the foot 18 of a leg link mechanism 3 as a free leg will both change over time. However, the posture of the foot 18 of a leg link mechanism 3 as a free leg may remain unchanged over all or part of the period during which the foot 18 moves in the air.

Further, for the foot 18 of a leg link mechanism 3 as a supporting leg in each step up to the second step, a desired position/posture trajectory of the foot 18 is determined in such a manner that the foot 18 is maintained in the state of being in contact with the floor, without slipping thereon. In this case, the desired position/posture of the foot 18 may be set to remain unchanged over the entire period during which the foot 18 is in contact with the floor, for example. Alternatively, the desired position/posture of the foot 18 may be set to change over time such that the floor-contacting portion of the foot 18 shifts (from the portion closer to the heel to the portion closer to the tiptoe, for example) over all or part of the period during which the foot 18 is in contact with the floor.

Further, the desired gait generating unit 42 of the control device 41 carries out, by the desired ZMP trajectory generating unit 53, the processing of generating a desired ZMP trajectory in the future for a period of up to a predetermined number of steps (up to the second step) by using the desired position/posture trajectory of each foot 18 generated in the moving/landing portion trajectory generating unit 52.

In this processing, the details of which will be described later, the desired ZMP trajectory generating unit 53 generates a desired ZMP trajectory as a trajectory which is expressed by a polynomial function of degree 2 or higher (function of time) under a predetermined constraint condition.

Next, the desired gait generating unit 42 of the control device 41 carries out, by the desired center-of-gravity trajectory generating unit 54, the processing of generating a desired center-of-gravity trajectory of the robot 1 in the future for a period of up to a predetermined number of steps (up to the second step), using a dynamic model of the robot 1, so as to fulfill the desired ZMP trajectory. In this case, in the present embodiment, an inverted pendulum model is used as the dynamic model of the robot 1.

Figure 5:
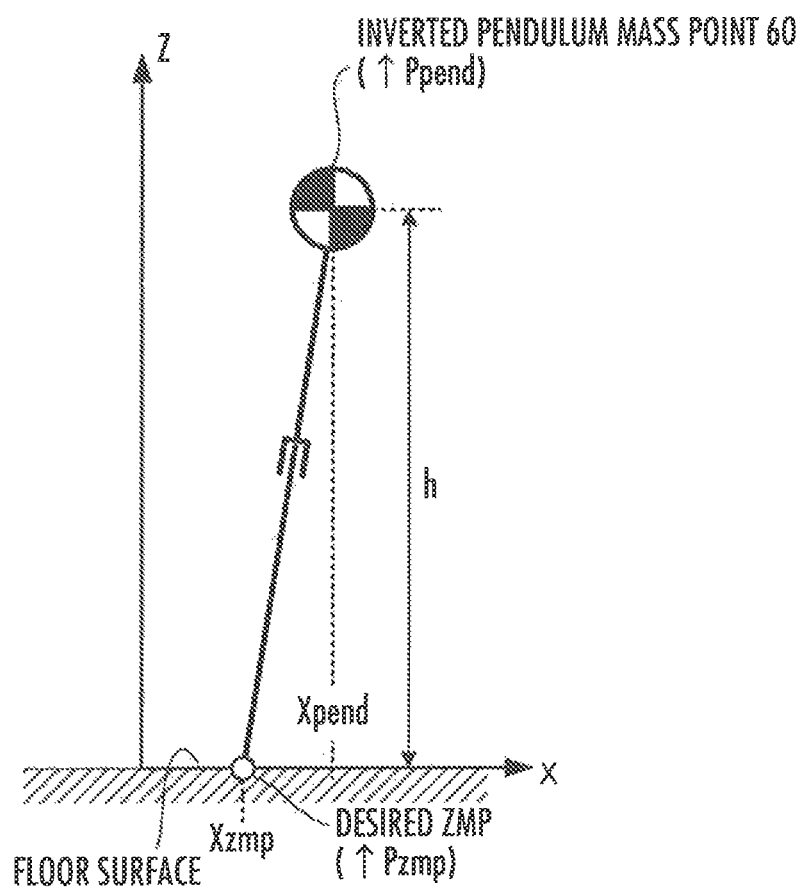
FIG. 5 illustrates an inverted pendulum model of a mobile robot.

The inverted pendulum model is a dynamic model which expresses the motion of the center of gravity of the robot 1 by the motion of an inverted pendulum mass point 60 shown in FIG. 5. In this inverted pendulum model, the inverted pendulum mass point 60, with its height from the floor surface maintained at a constant value h, moves on a horizontal plane at the height h, with a desired ZMP as the fulcrum. The mass of the inverted pendulum mass point 60 agrees with the mass of the entire robot 1.

It should be noted that FIG. 5 shows the inverted pendulum model observed from the Y-axis direction (projected on the XZ coordinate plane) of the global coordinate system.

The dynamic behavior of the inverted pendulum mass point 60 (center of gravity of the robot 1) in this inverted pendulum model is expressed by the following expression (1).

$$d^2 \uparrow Ppend/dt^2 = (g/h) \cdot (\uparrow Ppend - \uparrow Pzmp) \quad (1)$$

Here, ↑Ppend represents a two-component vector (=[Xpend, Ypend]$^T$) made up of a position Xpend in the X-axis direction and a position Ypend in the Y-axis direction of the inverted pendulum mass point 60 in the global coordinate system, ↑Pzmp represents a two-component vector (=[Xzmp, Yzmp]$^T$) made up of a position Xzmp in the X-axis direction and a position Yzmp in the Y-axis direction of a desired ZMP (=fulcrum of swing of the inverted pendulum mass point 60) in the global coordinate system, and g represents a gravitational acceleration constant.

As used herein, "↑" at the head of a given variable indicates that the variable is a vector (column vector), and the superscript "T" represents transposition of a vector or matrix.

The desired center-of-gravity trajectory generating unit 54 uses the desired ZMP trajectory (for a period up to the second step) generated in the desired ZMP trajectory generating unit 53 and the above expression (1) to calculate a time series of motion acceleration (value on the left side of the expression (1)) in the horizontal direction of the inverted pendulum mass point 60 for a period up to the second step, so as to fulfill the desired ZMP (specifically, such that the moments about the horizontal axes (moment about the X axis and moment about the Y axis) generated about the desired ZMP because of the resultant force of the inertial force generated by the motion of the inverted pendulum mass point 60 and the gravitational force acting on the inverted pendulum mass point 60 will become zero).

Then, the desired center-of-gravity trajectory generating unit 54 integrates (two times) the calculated motion acceleration, to calculate the trajectory of the position ↑Ppend of the inverted pendulum mass point 60 for a period up to the second step as a desired center-of-gravity trajectory of the robot 1 (specifically, trajectories of the horizontal positions (in the X-axis direction and in the Y-axis direction) of the center of gravity). It should be noted that the desired position in the Z-axis direction of the center of gravity of the entire robot 1 is a position at the height h.

Next, the desired gait generating unit 42 of the control device 41 carries out, by the desired joint displacement amount trajectory generating unit 55, the processing of generating a trajectory of a desired joint displacement amount of each joint of the robot 1 in the future for a predetermined number of steps (up to the second step). In this case, the desired joint displacement amount trajectory generating unit 55 generates a trajectory (time series of instantaneous values) of the desired joint displacement amount using, for example, a resolved momentum control method.

According to this resolved momentum control method, the desired joint displacement amount trajectory generating unit 55 sets a trajectory of desired translational momentum of the entire robot 1 (=desired translational momentum of the center of gravity) in accordance with the desired center-of-gravity trajectory of the robot 1. Further, the desired joint displacement amount trajectory generating unit 55 sets a trajectory of overall desired angular momentum about the center of gravity of the robot 1 (or about the desired ZMP), as appropriate. The desired joint displacement amount trajectory generating unit 55 also sets a trajectory of desired position/posture of each of the hands 30R, 30L, as the distal portions of the respective arm link mechanisms 4R, 4L, as appropriate.

It should be noted that the desired angular momentum and the trajectory of desired position/posture of each hand 30R, 30L may be designed and set arbitrarily.

The desired joint displacement amount trajectory generating unit 55 then uses the desired translational momentum, the desired angular momentum, and the desired positon/posture trajectory of each foot 18R, 18L and the desired position/posture trajectory of each hand 30R, 30L as the moving/landing portions, to calculate a trajectory (time series of instantaneous values for each predetermined control processing cycle) of desired joint displacement amount of each joint that may implement the desired translational momentum and the desired angular momentum, by the resolved momentum control method.

It should be noted that the desired joint displacement amount trajectory generating unit 55 may generate the trajectory of desired joint displacement amount by a technique other than the resolved momentum control method. For example, a multi-mass-point model (dynamic model) having one or more mass points set for the body 2 and for the respective leg link mechanisms 3 of the robot 1 (or a dynamic model having a flywheel added to the multi-mass-point model), a desired center-of-gravity trajectory, a desired ZMP trajectory, and a desired position/posture trajectory of each foot 18R, 18L may be used to generate a trajectory of desired position/posture of the body 2 that may fulfill the desired center-of-gravity trajectory and the desired ZMP trajectory. Then, from the trajectory of the desired position/posture of the body 2 and the desired position/posture trajectory of each foot 18R, 18L, a trajectory of desired joint displacement amount of each joint of each leg link mechanism 3 may be calculated by arithmetic processing of inverse kinematics.

In this case, the desired joint displacement amount of the joint 12a of the body 2 and the desired joint displacement amount of each of the joints 31 to 37 in each arm link mechanism 4 may be maintained at constant values, for example. Alternatively, they may be set to change over time in a certain pattern synchronized with the motions of the feet 18R and 18L.

As such, a desired gait for the robot 1 that may fulfill the desired position/posture trajectory of each foot 18R, 18L and the desired ZMP trajectory may be generated using various kinds of techniques.

In the above-described manner, in the present embodiment, the desired gait generating unit 42 of the robot 1 generates a trajectory of desired joint displacement amount of each joint in the future for a period of a predetermined number of steps (up to the second step), at each movement by one step of the robot 1.

The control device 41 then carries out, by the joint actuator controlling unit 43, the processing of controlling the displacement amount of each joint of the robot 1 in accordance with the trajectory of the joint displacement amount.

In this case, the joint actuator controlling unit 43 performs feedback control of the joint actuators 40 in such a way as to cause the actual displacement amount of each joint, detected by a corresponding displacement amount sensor (not shown) made up of a rotary encoder or the like, to track the desired joint displacement amount of that joint.

It should be noted that, in this case, the desired joint displacement amount at each predetermined control processing cycle may be corrected as appropriate by compliance control, for example, from the desired value generated in the desired joint displacement amount trajectory generating unit 55.

Supplementally, the processing of generating a desired gait (trajectory of desired joint displacement amount etc.) of the robot 1 may be carried out at each movement by a plurality of steps of the robot 1, or at a time interval shorter than the period of one step. Further, at each timing of carrying out the processing of generating a desired gait (desired joint displacement amount trajectory etc.) of the robot 1, a desired gait for a period shorter than the period up to the second step (for example, a period up to the first step) may be generated, or a desired gait for a period longer than the period up to the second step (for example, a period up to the third step) may be generated.

The processing performed by the desired ZMP trajectory generating unit 53, mentioned above briefly, will now be described in detail.

The desired ZMP trajectory generating unit 53 provides the control device 41 with the function as an example of the desired ZMP trajectory generating device of the present invention. The desired ZMP trajectory generating unit 53 includes the function as a polynomial function coefficient group determining unit 53a which determines a desired coefficient group comprising desired values of coefficients in respective terms of a polynomial function expressing the desired ZMP trajectory. The polynomial function coefficient group determining unit 53a corresponds to the polynomial function coefficient group determining section in the present invention.

Figure 6:
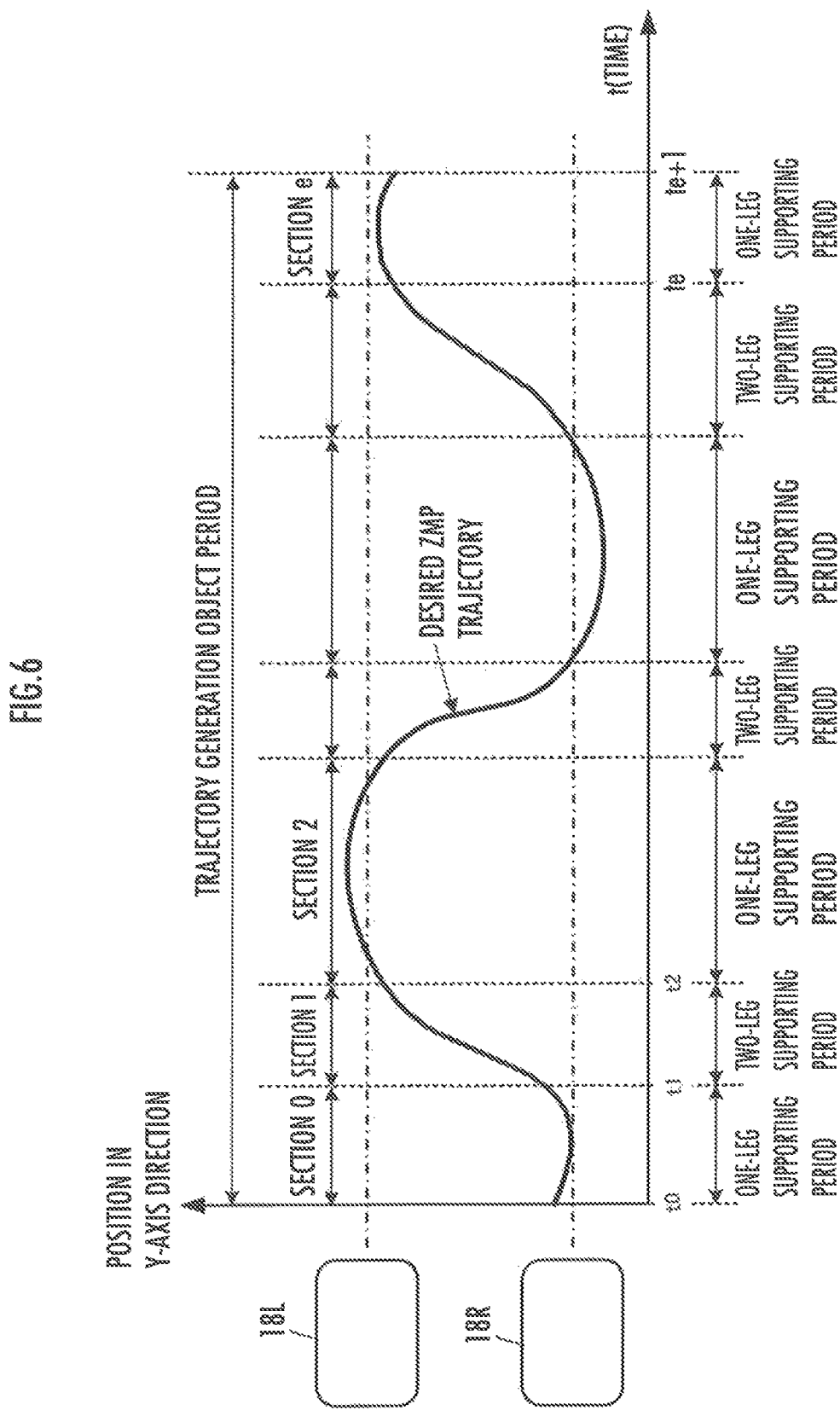
FIG. 6 illustrates dividing a trajectory generation object period of a desired ZMP trajectory.

In the present embodiment, the desired ZMP trajectory generating unit 53 divides a period (hereinafter, referred to as "trajectory generation object period") up to a predetermined number of steps (up to the second step), which generate a desired ZMP trajectory at each timing when the desired gait generating unit 42 carries out the processing of generating a desired gait (desired joint displacement amount trajectory etc.), into a plurality of sections i (i=0, 1, . . . , e), as illustrated in FIG. 6.

It should be noted that the desired ZMP trajectory in FIG. 6 shows, by way of example, a trajectory of a position in the Y-axis direction of the desired ZMP in the case where the robot 1 walks straight ahead. The foot 18R in the figure indicates a desired landing position in the Y-axis direction of the foot 18R when it is moved with the right leg link mechanism 3R as a free leg. The foot 18L in the figure indicates a desired landing position in the Y-axis direction of the foot 18L when it is moved with the leg link mechanism 3L as a free leg.

In the illustrated example, the trajectory generation object period is divided in such a manner that each section i corresponds to either one of a one-leg supporting period and a two-leg supporting period, for example. The trajectory generation object period is divided into e+1 sections, which are seven in this example. The trajectory generation object period, however, may be divided in a different manner. For example, the trajectory generation object period may be divided into a greater number of sections. Further, the trajectory generation object period may be divided such that each section i has a same time width, for example.

In the processing in the desired ZMP trajectory generating unit 53, a desired ZMP trajectory (specifically, trajectory of each component of the vector ↑Pzmp=[Xzmp, Yzmp]$^T$ composed of the position Xzmp in the X-axis direction and the position Yzmp in the Y-axis direction of the desired ZMP in the global coordinate system) in each section i constituting the trajectory generation object period is expressed by a polynomial function specific to that section i. It should be noted that the position in the Z-axis direction of the desired ZMP is defined as a position in the Z-axis direction of the point on the floor surface where the position in the X-axis direction and the position in the Y-axis direction become Xzmp and Yzmp, respectively.

A desired ZMP trajectory (trajectory of ↑Pzmp) in each section i (i=0, 1, . . . , e) is defined as a function of time t, by a polynomial function in the form of the following expression (2).

$$\uparrow\text{Pzmp}\_i(t) = \sum_{j=0}^{n} \uparrow W\_i, j \cdot (tc\_i(t))^j \quad (2)$$

$$= \uparrow W\_i, 0 + \uparrow W\_i, 1 \cdot (tc\_i(t)) +$$
$$\uparrow W\_i, 2 \cdot (tc\_i(t))^2 + \ldots + \uparrow W\_i, n \cdot (tc\_i(t))^n$$

where $$\uparrow\text{Pzmp}\_i(t) = \begin{pmatrix} \text{Xzmp}\_i(t) \\ \text{Yzmp}\_i(t) \end{pmatrix}$$

$$\uparrow W\_i, j = \begin{pmatrix} Wx\_i, j \\ Wy\_i, j \end{pmatrix}$$

tc_i(t):

$$\text{when } t\_i \le t \le t\_i+1, tc\_i(t) = \frac{t - t\_i}{T\_i} \quad (3a)$$

$$\text{when } t < t\_i \text{ or } t > t\_i+1, tc\_i(t) = 0 \quad (3b)$$

↑Pzmp_i(t) (=[Xzmp_i(t), Yzmp_i(t)]$^T$) on the left side of the expression (2) is a two-component vector indicating the position of the desired ZMP (position Xzmp_i(t) in the X-axis direction and position Yzmp_i(t) in the Y-axis direction) at a time t in a section i, n on the right side of the expression (2) is the degree of a polynomial function that expresses each component Xzmp_i(t), Yzmp_i(t) of ↑Pzmp_i(t) (hereinafter, this may be referred to as "desired ZMP vector ↑Pzmp_i(t)), and ↑W_ij (=[Wx_ij, Wy_ij]$^T$) (j=0, 1, . . . , n) is a vector composed of a coefficient Wx_ij of a term of degree j among the terms of the polynomial function expressing Xzmp_i(t), and a coefficient Wy_ij of a term of degree j among the terms of the polynomial function expressing Yzmp_i(t).

It should be noted that, in the present embodiment, the degree n of the polynomial function that expresses each component Xzmp_i(t), Yzmp_i(t) of the desired ZMP vector ↑Pzmp_i(t) is, for example, "7".

Further, tc_i(t) on the right side of the expression (2), representing a normalized time of the section i, is defined by the expressions (3a) and (3b). In these expressions (3a) and (3b), t_i is a starting time of the section i, t_i+1 is an ending time of the section i (=starting time of a section i+1), and T_i is a time width of the section i.

Therefore, the normalized time tc_i(t) defined by the expressions (3a) and (3b) is a time normalized by regarding the starting time t_i of each section i as "0" and the time width T_i as "1".

In the case where each component Xzmp_i(t), Yzmp_i(t) of the desired ZMP vector ↑Pzmp_i(t) in each section i in the trajectory generation object period is expressed by a polynomial function as described above, the desired ZMP trajectory (trajectory of ↑Pzmp_i(t)) in the trajectory generation object period is defined by values of coefficients Wx_ij, Wy_ij (i=0, 1, . . . , e; j=0, 1, . . . , n) in respective terms of the polynomial functions for respective ones of all the sections i in the trajectory generation object period.

The desired ZMP trajectory generating unit 53 therefore includes the polynomial function coefficient group determining unit 53a which determines a desired coefficient group composed of desired values of coefficients Wx_ij, Wy_ij in respective terms of the polynomial functions that express the respective components Xzmp_i(t), Yzmp_i(t) of the desired ZMP vector ↑Pzmp_i(t) in the respective sections i constituting the trajectory generation object period.

The polynomial function coefficient group determining unit 53a determines the desired coefficient group by an algorithm of a known solution method for a quadratic programming problem, by using a quadratic evaluation function (objective function) including square values of the coefficients Wx_ij, Wy_ij included in the desired coefficient group as variables, and a plurality of linear constraints each expressed by a linear equality or linear inequality regarding the coefficients Wx_ij, Wy_ij.

In this case, in the present embodiment, the following are used as the linear constraints: a constraint condition (hereinafter, "stabilization condition") for maintaining the inverted pendulum mass point 60 in the aforesaid inverted pendulum model in a stable state continuously; a constraint condition (hereinafter, "passing point condition") defining a passing point of a desired ZMP trajectory; a constraint condition (hereinafter, "trajectory connection condition") regarding connection of the desired ZMP trajectory at a boundary between the neighboring sections i−1 and i (i=1, 2, . . . , e) in the trajectory generation object period; and a constraint condition (hereinafter, "ZMP existence permissible region condition") for restricting the position of the desired ZMP to a position within a supporting polygon, which will be described later.

The stabilization condition, passing point condition, and trajectory connection condition are constraint conditions expressed by linear equalities, and the ZMP existence permissible region condition is a constraint condition expressed by linear inequalities. The linear equality is an equality which expresses a relationship that a linear combination of a plurality of coefficients among the coefficients Wx_ij, Wy_ij (i=0, 1, . . . , e; j=0, 1, . . . , n) in the terms of the polynomial functions for respective ones of all the sections i in the trajectory generation object period equals a certain constant value. The linear inequality is an inequality which expresses a relationship that a linear combination of the plurality of coefficients is greater or smaller than a certain constant value.

It should be noted that the stabilization condition, the passing point condition, the trajectory connection condition, and the ZMP existence permissible region condition correspond to the second constraint condition, the third constraint condition, the fourth constraint condition, and the first constraint condition, respectively, of the present invention.

Linear equalities or linear inequalities expressing these constraint conditions will now be described specifically.

First, the stabilization condition is, in the present embodiment, a constraint condition expressed as a condition (hereinafter, "divergence component condition") that a value of a divergence component (hereinafter, referred to as "terminal divergence component") of the inverted pendulum model at an ending time of the trajectory generation object period (period of two steps in the present embodiment) agrees with a value of a divergence component (hereinafter, referred to as "normal-gait initial divergence component") of the inverted pendulum model at a starting time (=ending time of the trajectory generation object period) of a normal gait as a virtual gait that follows the gait of the robot 1 in the trajectory generation object period.

It should be noted that the normal gait and the divergence component are described in detail in the aforesaid Patent Literature 1, for example. Therefore, only a brief description will be made in the present embodiment.

The normal gait is a gait which is virtually assumed as a gait following the gait of the robot 1 in the trajectory generation object period, and which allows the robot 1 to move continuously, with the motions of the portions of the robot 1, including each moving/landing portion and the body 2, repeated cyclically in a certain pattern.

Such a normal gait, allowing the robot 1 to move continuously, is a gait which can keep the inverted pendulum mass point 60 of the inverted pendulum model, expressing the behavior of the center of gravity of the robot 1, in a stable state (in which the position in the horizontal direction of the inverted pendulum mass point 60 does not deviate largely from the position immediately above the fulcrum (desired ZMP)).

In the present embodiment, the normal gait in the case where the robot 1 travels in a biped gait operation is, as shown for example in FIG. 3, a cyclic gait (with a period of two steps as one cycle) that follows the operation on the second step of the robot 1 in the trajectory generation object period. In FIG. 3, the landing position/posture of the foot 18 at each step in the normal gait is shown by a broken line.

Further, the divergence component of the inverted pendulum model at a given time t is a value ↑q(t) (vector composed of component qx(t) in the X-axis direction and component qy(t) in the Y-axis direction) which is defined as a linear combination of the position ↑Ppend of the inverted pendulum mass point 60 and the moving velocity d↑Ppend(t)/dt (temporal change rate of ↑Ppend) of the inverted pendulum mass point 60, as expressed by the following expression (4).

$$\uparrow q(t) = \uparrow Ppend(t) + (1/\omega) \cdot d\uparrow Ppend(t)/dt \quad (4)$$

where $\omega = \sqrt{(g/h)}$

It should be noted that $\sqrt{(g/h)}$ is a square root of (g/h).

By setting a desired ZMP trajectory so as to fulfill the aforesaid divergence component condition for the divergence component defined as described above, it is possible to determine a desired gait of the robot 1 in the trajectory generation object period in such a manner that it converges to a motional state of the robot 1 in a normal gait that may keep the inverted pendulum mass point 60 of the inverted pendulum model continuously in a stable state in the future following the trajectory generation object period.

Thus, in the present embodiment, the divergence component condition is used as a constraint condition (stabilization condition) regarding the desired ZMP trajectory.

In the inverted pendulum model, the relationship between the divergence component ↑q(t) in the trajectory generation object period and the desired ZMP vector ↑Pzmp(t) in the trajectory generation object period is expressed by the following expression (5).

$$\uparrow q(t) = \exp(\omega \cdot t) \cdot (\uparrow q(t\_0) - \omega \cdot \int_{t\_0}^{t} \exp(-\omega \cdot t) \cdot \uparrow Pzmp(t) dt \quad (5)$$

Here, exp( ) is an exponential function of the base e of a natural logarithm, ↑q(t_0) is a value of the divergence component at a starting time t_0 of the trajectory generation object period, and ↑Pzmp(t) is a desired ZMP vector at a given time t in the trajectory generation object period. ↑Pzmp(t) in each section i in the trajectory generation object period agrees with the desired ZMP vector ↑Pzmpi(t) in that section i.

Therefore, when a normal-gait initial divergence component as a desired value of the divergence component at the ending time t_e+1 (=↑q(t_e+1)) of the trajectory generation object period is denoted as ↑q_target, the divergence component condition as the stabilization condition is expressed by the following expression (6).

$$-\omega \cdot \int_{t\_0}^{t\_e+1} \exp(-\omega \cdot t) \cdot \uparrow Pzmp(t) dt = \exp(-\omega \cdot (t\_e+1)) \cdot \uparrow q\_target - \uparrow q(t\_0) \quad (6)$$

Further, when the above expressions (2), (3a), and (3b) are applied to the left side of the expression (6), the left side of the expression (6) is rewritten as the following expression (7).

$$-\omega \cdot \int_{t\_0}^{t\_e+1} \exp(-\omega \cdot t) \cdot \uparrow Pzmp(t) dt = \quad (7)$$

$$-\omega \cdot \sum_{i=0}^{e} \int_{t\_i}^{t\_i+1} \left( \exp(-\omega \cdot t) \cdot \sum_{j=0}^{n} \uparrow W\_i, j \cdot (tc\_i(t))^j \right) dt =$$

$$-\omega \cdot \sum_{i=0}^{e} \int_{0}^{1} \left( \exp(-\omega \cdot (T\_i \cdot tc\_i + t\_i)) \cdot \sum_{j=0}^{n} \uparrow W\_i, j \cdot (tc\_i)^j \right)$$

$$dtc\_i = -\sum_{i=0}^{e} \exp(-\omega \cdot t\_i) \cdot \left( \sum_{j=0}^{n} \uparrow W\_i, j \cdot S\_i, j \right)$$

where $$S\_i, j = j! \cdot (\omega\_i)^{-j} - \exp(\omega\_i) \cdot \sum_{k=0}^{j} {}_j P_{j-k} \cdot (\omega\_i)^{-(j-k)}$$

$$\omega\_i = \omega \cdot T\_i$$

$$_j P_{j-k} = \frac{j!}{k!}$$

It should be noted that j! and k! represent a factorial of j and a factorial of k, respectively.

The first component of the right side of the expression (7) is expressed as a linear combination of (e+1)·(n+1) coefficients Wx_ij (i=0, 1, . . . , e; j=0, 1, . . . , n), and the second component is expressed as a linear combination of (e+1)·(n+1) coefficients Wy_ij (i=0, 1, . . . , e; j=0, 1, . . . , n).

Further, the first and second components of the right side of the expression (6) are constant values. Therefore, the divergence component condition is expressed as a linear equality of the following expression (8).

$$\sum_{i=0}^{e} \sum_{j=0}^{n} a\_i, j \cdot \begin{pmatrix} Wx\_i, j \\ Wy\_i, j \end{pmatrix} = \begin{pmatrix} C1x \\ C1y \end{pmatrix} \quad (8)$$

where $$a\_i, j = \exp(-\omega \cdot t\_i) \cdot S\_i, j$$

Here, a_ij is a coefficient of Wx_ij and Wy_ij, and C1x and C1y are constant values.

The desired ZMP trajectory generating unit 53 sets the expressions of the first component and the second component of the above expression (8) as linear equalities expressing the divergence component condition (stabilization condition).

In this case, the coefficient a_ij is calculated in accordance with the arithmetic expression of the above expression (7), from predetermined set values of each of the eigenfrequency $\omega(=\sqrt{(g/h)})$ of the inverted pendulum model, the number of sections i ($=i+1$) in the trajectory generation object period, the degree n of the polynomial function in each section i, and the time width T_i of each section i.

Further, the constant values C1x and C1y are calculated by the arithmetic expression on the right side of the expression (6), from a predetermined set value of the eigenfrequency $\omega(=\sqrt{(g/h)})$ of the inverted pendulum model, the ending time t_e+1 of the trajectory generation object period, the value of the normal-gait initial divergence component ↑q_target (desired value of the divergence component at the ending time of the trajectory generation object period), and the value of the divergence component ↑q(t_0) at the starting time t_0 of the trajectory generation object period.

In this case, ↑q(t_0) is calculated from the position of the center of gravity of the robot 1 and its moving velocity at the starting time t_0 which are defined by the already-created desired gait of the robot 1 up to the starting time t_0.

Further, the normal-gait initial divergence component ↑q_target is determined for example in the following manner. The desired ZMP trajectory generating unit 53 sets a position/posture trajectory of a foot 18 at each step in a normal gait in accordance with the desired position/posture trajectory of the foot 18 in the trajectory generation object period.

For example, the position/posture trajectory of a foot 18 in the normal gait is set such that, with the right leg link mechanism 3R as a supporting leg and the left leg link mechanism 3L as a free leg, the pattern of position/posture trajectory of the free leg's foot 18L (relative position/posture trajectory observed from the supporting leg's foot 18R) in each step where the foot 18L is moved (in each odd-numbered step in the normal gait) becomes the same as the pattern of the desired position/posture trajectory of the foot 18L at the first step in the trajectory generation object period, and such that, with the left leg link mechanism 3L as a supporting leg and the right leg link mechanism 3R as a free leg, the pattern of position/posture trajectory of the free leg's foot 18R (relative position/posture trajectory observed from the supporting leg's foot 18L) in each step where the foot 18R is moved (in each even-numbered step in the normal gait) becomes the same as the pattern of the desired position/posture trajectory of the foot 18R at the second step in the trajectory generation object period.

The desired ZMP trajectory generating unit 53 then determines a desired ZMP trajectory in each cycle of the normal gait in such a manner that a trajectory of the position of the center of gravity (trajectory of the position of the inverted pendulum mass point 60) that may fulfill the condition that the motional state (position, moving velocity, and acceleration) of the center of gravity of the robot 1 at the ending time of each cycle of the normal gait (=at the starting time of the next cycle) agrees with the motional state at the starting time of that cycle may be generated by the inverted pendulum model. In this case, the desired ZMP trajectory of the normal gait may be a trajectory in the form of a polygonal line.

Here, that the position constituting the motional state of the center of gravity of the robot 1 at the ending time of each cycle (=at the starting time of the next cycle) of the normal gait agrees with the position of the center of gravity at the starting time of that cycle means, more specifically, that the position of the center of gravity at the starting time of each cycle of the normal gait in the case where that center of gravity is observed in a global coordinate system (supporting leg coordinate system) set at the position of the supporting leg's foot in that cycle and the position of the center of gravity at the ending time of each cycle of the normal gait in the case where that center of gravity is observed in a global coordinate system (supporting leg coordinate system) set at the position of the supporting leg's foot in the next cycle of that cycle agree with each other.

Then, the normal-gait initial divergence component ↑q_target is determined from the trajectory of the position of the inverted pendulum mass point 60 (trajectory of the position of the center of gravity) defined on the basis of the above expression (1) in accordance with the desired ZMP trajectory determined as described above.

It should be noted that the specific way of obtaining the normal-gait initial divergence component ↑q_target is described in detail in, for example, the aforesaid Patent Literature 1 or Japanese Patent No. 4805818. Therefore, the detailed description thereof will be omitted herein.

Supplementally, in the case where $2 \cdot (e+1) \cdot (n+1)$ coefficients Wx_ij, Wy_ij as a combination of the $(e+1) \cdot (n+1)$ coefficients Wx_ij regarding the component in the X-axis direction of the desired ZMP and the $(e+1) \cdot (n+1)$ coefficients Wy_ij regarding the component in the Y-axis direction thereof is denoted as ↑W, then the expressions of the respective ones of the first component (first row) and the second component (second row) of the above expression (8) as the linear equalities expressing the divergence component condition can be expressed as the linear equalities in the form of $\uparrow W^T \cdot \uparrow \alpha = C$ as well. Here, ↑α is a coefficient vector in the linear combination of the components of $\uparrow W^T$, and C is a constant value. For example, when ↑α is a coefficient vector with the component for Wx_ij being a_i,j and the component for Wy_i,j being zero and when C equals C1x, then the first component of the expression (8) can be expressed by the linear equality in the form of: $\uparrow W^T \cdot \uparrow \alpha = C$.

Next, the aforesaid passing point condition is, more specifically, a condition that the desired ZMP trajectory passes through a passing point (on a floor surface) at a predetermined position determined in advance at a predetermined time tf determined in advance. Such a passing point may be designed and set arbitrarily. There may be two or more passing points.

For example, it is desirable to set a passing point at a timing at which a free leg's foot 18 lands on the floor or at a timing at which the foot 18 leaves the floor. The passing point is preferably set at a central position of the floor-contacting surface (coming into contact with the floor) of the foot 18 at the landing timing or the leaving timing.

The passing point condition may be expressed as a condition that the value of the desired ZMP vector ↑Pzmp(t) at a predetermined time tf on the desired ZMP trajectory becomes a predetermined value ↑Pzmp(tf) ($=[Xzmp(tf), Yzmp(tf)]^T$ determined in advance for each passing point. Therefore, when the time tf is a time in a section if, then the passing point condition is expressed by the linear equality of the following expression (9).

$$\sum_{j=0}^{n} \begin{pmatrix} Wx\_if \\ Wy\_if \end{pmatrix} \cdot (tc\_if(tf))^j = \begin{pmatrix} Xzmp(tf) \\ Yzmp(tf) \end{pmatrix} \quad (9)$$

Thus, the desired ZMP trajectory generating unit 53 uses the value (constant value) of ↑Pzmp(tf) corresponding to each passing point determined in advance and the time tf, to set the expressions of the first component and the second component of the above expression (9) as linear equalities expressing the passing point condition.

Supplementally, as with the case explained supplementally regarding the linear equalities expressing the divergence component condition, by using the vector ↑W comprising the 2·(e+1)·(n+1) coefficients Wx_ij, Wy_ij, the expressions of the respective ones of the first and second components of the above expression (9) as the linear equalities expressing the passing point condition can be expressed as the linear equalities in the form of ↑W$^T$·↑α=C as well.

Next, the trajectory connection condition is, in the present embodiment, more specifically a condition that the desired ZMP trajectory in a section i−1 (i=1, 2, . . . , e) and the desired ZMP trajectory in a section i are connected smoothly. Such a trajectory connection condition may be expressed as a condition that a position of the desired ZMP, on the desired ZMP trajectory in the section i−1, at the ending time (time t_i) of the section i−1 and a differential value of a predetermined order of that position of the desired ZMP agree with a position of the desired ZMP, on the desired ZMP trajectory in the section i, at the starting time (time t_i) of the section i and a differential value of the predetermined order of that position of the desired ZMP, respectively.

In the present embodiment, the differential value of a predetermined order described above includes, by way of example, two values of: a moving velocity of the ZMP (first order differential value of the position of the desired ZMP); and a moving acceleration thereof (second order differential value of the position of the desired ZMP).

In this case, the trajectory connection conditions about the position, moving velocity, and moving acceleration of the desired ZMP at respective boundaries between a preceding section i−1 and a succeeding section i (i=1, 2, . . . , e) adjacent to each other are expressed by the following expressions (10a), (10b), and (10c), respectively.

$$\sum_{j=0}^{n} \binom{Wx\_i-1, j}{Wy\_i-1, j} \cdot (tc\_i-1(t\_i))^j = \sum_{j=0}^{n} \binom{Wx\_i, j}{Wy\_i, j} \cdot (tc\_i(t\_i))^j \quad (10a)$$

$$\frac{1}{T\_i-1} \cdot \sum_{j=1}^{n} \binom{Wx\_i-1, j}{Wy\_i-1, j} \cdot j \cdot (tc\_i-1(t\_i))^{j-1} = \frac{1}{T\_i} \cdot \sum_{j=1}^{n} \binom{Wx\_i, j}{Wy\_i, j} \cdot j \cdot (tc\_i(t\_i))^{j-1} \quad (10b)$$

$$\frac{1}{(T\_i-1)^2} \cdot \sum_{j=2}^{n} \binom{Wx\_i-1, j}{Wy\_i-1, j} \cdot j \cdot (j-1) \cdot (tc\_i-1(t\_i))^{j-2} = \frac{1}{(T\_i)^2} \cdot \sum_{j=2}^{n} \binom{Wx\_i, j}{Wy\_i, j} \cdot j \cdot (j-1) \cdot (tc\_i(t\_i))^{j-2} \quad (10c)$$

Further, taking into consideration that the normalized time tc_i−1(t_i) corresponding to the ending time ti of the section i−1 equals 1, that the normalized time tc_i(t_i) corresponding to the starting time ti of the section i equals 0, and that $0^0$ (zero to the zero power) equals 1, the expressions (10a) to (10c) are rewritten as the following expressions (11a) to (11c), respectively.

$$\sum_{j=0}^{n} \binom{Wx\_i-1, j}{Wy\_i-1, j} - \binom{Wx\_i, 0}{Wy\_i, 0} = \binom{0}{0} \quad (11a)$$

$$\frac{1}{T\_i-1} \cdot \sum_{j=1}^{n} \binom{Wx\_i-1, j}{Wy\_i-1, j} \cdot j - \frac{1}{T\_i} \cdot \binom{Wx\_i, 1}{Wy\_i, 1} = \binom{0}{0} \quad (11b)$$

$$\frac{1}{(T\_i-1)^2} \cdot \sum_{j=2}^{n} \binom{Wx\_i-1, j}{Wy\_i-1, j} \cdot j \cdot (j-1) - \frac{2}{(T\_i)^2} \cdot \binom{Wx\_i, 2}{Wy\_i, 2} = \binom{0}{0} \quad (11c)$$

Thus, the desired ZMP trajectory generating unit 53 sets the above expressions (11a), (11b), and (11c) as linear equalities expressing the trajectory connection condition, for the respective boundaries between a section i−1 and a section i (i=1, 2, . . . , e), by using the set value of the time width T_i (i=0, 1, . . . , e) determined in advance for each section i.

Supplementally, as with the case explained supplementally regarding the linear equalities expressing the divergence component condition, by using the vector ↑W comprising the 2·(e+1)·(n+1) coefficients Wx_ij, Wy_ij, the expressions of the respective ones of the first and second components of the above expressions (11a), (11b), and (11c) as the linear equalities expressing the trajectory connection condition can be expressed as the linear equalities in the form of ↑W$^T$·↑α=C as well.

It should be noted that the differential values of predetermined orders of the position of the ZMP used as the elements of the trajectory connection condition are not limited to both of the moving velocity and moving acceleration of the ZMP. For example, the moving acceleration may be excluded from the elements of the trajectory connection condition, or a third order differential value of the position of the ZMP may be used as an element of the trajectory connection condition.

Next, the ZMP existence permissible region condition is, more specifically, a condition that the desired ZMP at a given time in the trajectory generation object period exists within a supporting polygon which matches or approximates a smallest convex region that includes the floor-contacting surface of the robot 1 at that time.

It should be noted that the convex region is, in a one-leg supporting period, a region formed by the floor-contacting surface of the foot 18 of a leg link mechanism 3 as a supporting leg, and, in a two-leg supporting period, a region including both of the floor-contacting surfaces of the feet 18R, 18L of the leg link mechanisms 3R, 3L.

Figure 7A:
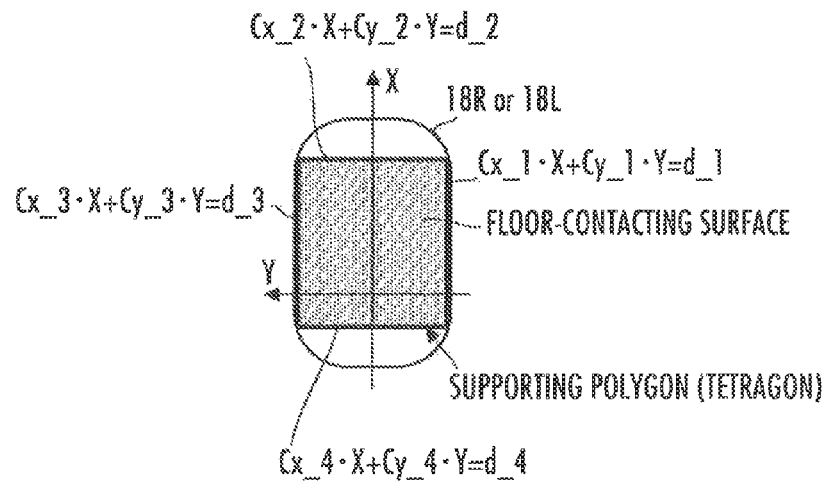
Figure 7B:
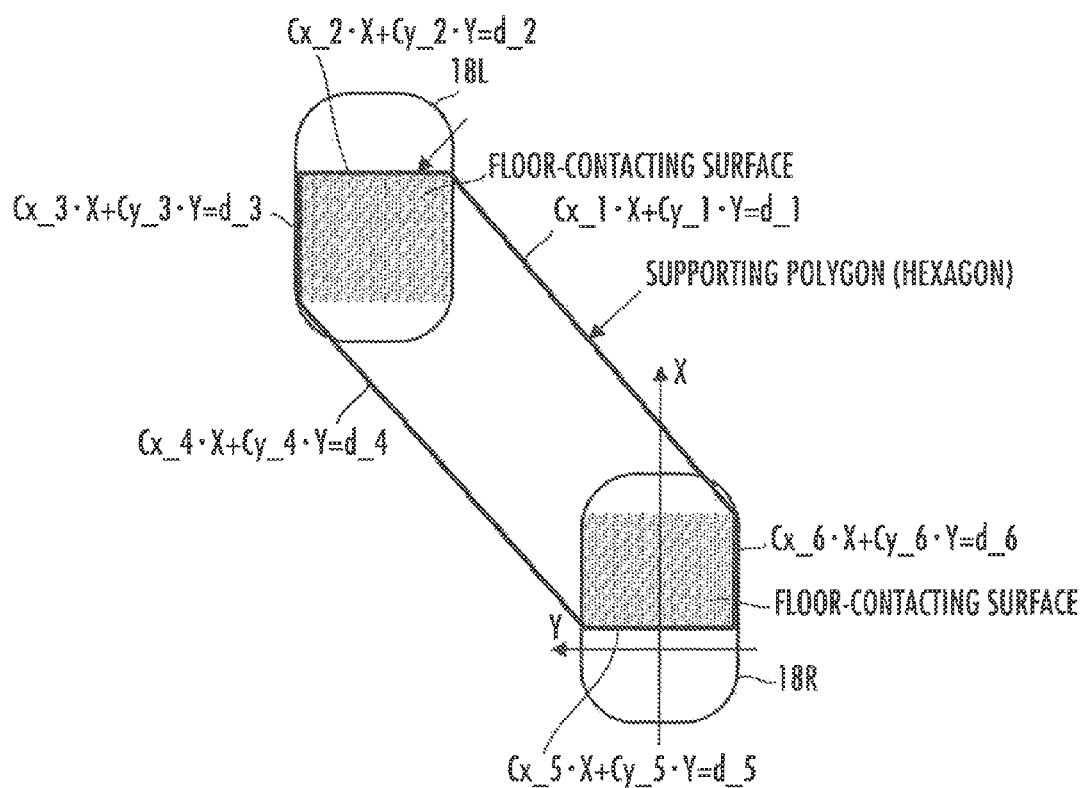

In the present embodiment, the supporting polygon in a one-leg supporting period in which only a foot 18 of one of the leg link mechanisms 3R, 3L is in contact with the floor is represented as a tetragon, as illustrated in FIG. 7A for example, and the supporting polygon in a two-leg supporting period in which the feet 18R, 18L of both leg link mechanisms 3R, 3L are in contact with the floor is represented as a hexagon, as illustrated in FIG. 7B for example.

Here, the stippled region in FIG. 7A represents an example of the floor-contacting surface of a foot 18 (18R in the illustrated example) in a one-leg supporting period, and the stippled regions in FIG. 7B represent examples of the floor-contacting surfaces of the feet 18R and 18L in a two-leg supporting period. In the illustrated examples, each supporting polygon matches or almost matches the smallest convex region described above, although the supporting polygon may be a polygonal region inside the convex region.

Each side of the supporting polygon, when projected on the XY coordinate plane of the global coordinate system, is expressed by the following expression (12).

$$Cx\_m \cdot x + Cy\_m \cdot y = d\_m \quad (12)$$

where m=1, 2, . . . , M

It should be noted that the suffix m represents the number applied to a side of the supporting polygon, and M is a total number of the sides included in the supporting polygon. Further, $Cx\_m$, $Cy\_m$, and $d\_m$ are constant values determined for the side of the number m. The values of these constant values $Cx\_m$, $Cy\_m$, and $d\_m$ can be determined from the positions of two points (for example, points on corners of the supporting polygon) on a straight line including each side.

The ZMP existence permissible region condition is expressed by a set of M inequalities (13-m) (m=1, 2, . . . , M) corresponding respectively to the sides of the supporting polygon.

$$Cx\_m \cdot Xzmp + Cy\_m \cdot Yzmp < d\_m$$

or $$Cx\_m \cdot Xzmp + Cy\_m \cdot Yzmp > d\_m \quad (13\text{-}m)$$

where m=1, 2, . . . , M

Here, the desired ZMP vector $\uparrow Pzmp\_i = [Xzmp\_i, Yzmp\_i]^T$ in each section i in the trajectory generation object period is expressed by the above expression (2). Therefore, the ZMP existence permissible region condition at a given time t (in the normalized time, time $tc\_i(t)$) in a given section i in the trajectory generation object period is expressed by the following M linear inequalities (14-m) (m=1, 2, . . . , M).

$$Cx\_m \cdot \sum_{j=0}^{n} (tc\_i(t))^j \cdot Wx\_i, j + \quad (14-m)$$

$$Cy\_m \cdot \sum_{j=0}^{n} (tc\_i(t))^j \cdot Wy\_i, j < d\_m$$

or $$Cx\_m \cdot \sum_{j=0}^{n} (tc\_i(t))^j \cdot Wx\_i, j +$$

$$Cy\_m \cdot \sum_{j=0}^{n} (tc\_i(t))^j \cdot Wy\_i, j > d\_m$$

where m = 1, 2, . . . , M

The linear inequalities (14-m) are linear inequalities about a linear combination of a total of $2 \cdot (n+1)$ coefficients $Wx\_ij$, $Wy\_ij$ (j=0, 1, . . . , n).

Thus, the desired ZMP trajectory generating unit 53 sets the inequalities expressed by the expressions (14-m) as linear inequalities expressing the ZMP existence permissible region condition.

More specifically, the desired ZMP trajectory generating unit 53 first sets a plurality of sampling times (in predetermined increments, for example) in the trajectory generation object period, and sets the expression (expression (12)) for each side of the supporting polygon at each sampling time, on the basis of the desired positions/postures of the feet 18R, 18L at the sampling time. In this case, each side of the supporting polygon at each sampling time is set to match or approximate the boundary of the smallest convex region (defined by the desired positions/postures of the feet 18R, 18L at that time) that includes the floor-contacting surface(s) of one or both of the feet 18R, 18L at that time.

Regarding the setting of a plurality of sampling times in the trajectory generation object period, the sampling times may be set such that the same number of sampling times are included in each of the sections i, for example.

Then, at each sampling time, the desired ZMP trajectory generating unit 53 sets M linear inequalities expressed by the above expressions (14-m), as linear inequalities expressing the ZMP existence permissible region condition, by using the value of that time t as well as set values of the constant values $Cx\_m$, $Cy\_m$, and $d\_m$ which express the expressions of the respective sides of the supporting polygon set for that time.

Supplementally, as with the case explained supplementally regarding the linear equalities expressing the divergence component condition, by using the vector TW comprising the $2 \cdot (e+1) \cdot (n+1)$ coefficients $Wx\_ij$, $Wy\_ij$, the above expressions (14-m) (m=1, 2, . . . , M) as the linear inequalities expressing the ZMP existence permissible region condition can be expressed as the linear inequalities in the form of $\uparrow W^T \cdot \uparrow \alpha < C$ or $\uparrow W^T \cdot \uparrow \alpha > C$ as well.

In the present embodiment, the supporting polygon in a one-leg supporting period was a tetragon and the supporting polygon in a two-leg supporting period was a hexagon. However, a polygon having a different number of corners may be used as one or both of the supporting polygons in the one-leg supporting period and the two-leg supporting period. For increasing the degree of freedom of the desired ZMP trajectory, the supporting polygon is preferably a polygon having an area (size) that is as close as possible to the area of the aforesaid convex region.

A description will now be made about a quadratic evaluation function which includes, as variables, square values of coefficients $Wx\_ij$, $Wy\_ij$ included in the desired coefficient group.

In the present embodiment, as an evaluation function (objective function) for determining the desired coefficient group by an algorithm of a solution method for a quadratic programming problem, a function obtained by integrating a square value $(\uparrow Azmp)^2$ $(=\uparrow Azmp^T \cdot \uparrow Azmp)$ of a changing acceleration $\uparrow Azmp$ $(=d^2 \uparrow Pzmp/dt^2 = [d^2 Xzmp/dt^2, d^2 Yzmp/dt^2]^T)$ of a desired ZMP vector $\uparrow Pzmp = [Xzmp, Yzmp]^T$ is used so as to avoid an abrupt change of the desired ZMP as much as possible. Hereinafter, $\uparrow Azmp$ will be referred to as "ZMP acceleration", and its square value $(\uparrow Azmp)^2$ $(=\uparrow Azmp^T \cdot \uparrow Azmp)$ will be referred to as "ZMP square acceleration".

Here, the ZMP acceleration $\uparrow Azmp\_i(t)$ $(=[Axzmp\_i(t), Ayzmp\_i(t)]^T)$ at a given time t in each section i (i=0, 1, . . . , e) of the trajectory generation object period is expressed, using the above expression (2), by the following expression (15).

$$\uparrow Azmp\_i(t) = \begin{pmatrix} Axzmp\_i(t) \\ Ayzmp\_i(t) \end{pmatrix} \quad (15)$$

$$= \frac{1}{(T\_i)^2} \cdot \sum_{j=2}^{n} \begin{pmatrix} Wx\_i, j \\ Wy\_i, j \end{pmatrix} \cdot j \cdot (j-1) \cdot (tc\_i(t))^{j-2}$$

$$= \begin{pmatrix} (\uparrow Wx\_i)^T \cdot \uparrow h(tc\_i(t)) \\ (\uparrow Wy\_i)^T \cdot \uparrow h(tc\_i(t)) \end{pmatrix}$$

where $$\uparrow Wx\_i = \begin{pmatrix} Wx\_i, 0 \\ Wx\_i, 1 \\ Wx\_i, 2 \\ \vdots \\ Wx\_i, n \end{pmatrix}$$

$$\uparrow Wy\_i = \begin{pmatrix} Wy\_i, 0 \\ Wy\_i, 1 \\ Wy\_i, 2 \\ \vdots \\ Wy\_i, n \end{pmatrix}$$

$$\uparrow h(tc\_i(t)) = \begin{pmatrix} 0 \\ 0 \\ h2(t) \\ \vdots \\ hn(t) \end{pmatrix}$$

$$hj(t) = \frac{1}{(T\_i)^2} \cdot j \cdot (j-1) \cdot (tc\_i(t))^{j-2} \, (j=2,3,\ldots,n)$$

As each of the components $Axzmp\_i(t)$ and $Ayzmp\_i(t)$ of the ZMP acceleration $\uparrow Azmp\_i(t)$ is a scalar, the square values $(Axzmp\_i(t))^2$ and $(Ayzmp\_i(t))^2$ of the respective components are expressed by the following expressions (16a) and (16b).

$$P(Axzmp\_i(t))^2 = \uparrow Wx\_i^T \cdot \uparrow h(tc\_i(t)) \cdot h(tc\_i(t))^T \cdot \uparrow Wx\_i = \uparrow Wx\_i^T \cdot Hd\_m(tc\_i(t)) \cdot \uparrow Wx\_i \quad (16a)$$

$$(Ayzmp\_i(t))^2 = \uparrow Wy\_i^T \cdot \uparrow h(tc\_i(t)) \cdot h(tc\_i(t))^T \cdot \uparrow Wy\_i = \uparrow Wy\_i^T \cdot Hd\_m(tc\_i(t)) \cdot \uparrow Wy\_i \quad (16b)$$

where $Hd\_m(tc\_i(t)) = \uparrow h(tc\_i(t)) \cdot h(tc\_i(t))^T$ (: square matrix of order $(n+1)$)

Therefore, the integrals (from time $t\_i$ to time $t\_i+1$) of respective ones of the square values $(Axzmp\_i(t))^2$ and $(Ayzmp\_i(t))^2$ in a section i are expressed by the following expressions (17a) and (17b).

$$\int_{t\_i}^{t\_i+1} (Axzmp\_i(t))^2 dt = \int_0^1 ((Axzmp\_i(tc\_i))^2 \cdot T\_i) dtc\_i \quad (17a)$$

$$= T\_i \cdot \uparrow Wx\_i^T \cdot \left( \int_0^1 Hd\_m(tc\_i) dtc\_i \right) \cdot \uparrow Wx\_i$$

$$= T\_i \cdot \uparrow Wx\_i^T \cdot H\_m(T\_i) \cdot \uparrow Wx\_i$$

$$\int_{t\_i}^{t\_i+1} (Ayzmp\_i(t))^2 dt = \int_0^1 ((Ayzmp\_i(tc\_i))^2 \cdot T\_i) dtc\_i \quad (17b)$$

$$= T\_i \cdot \uparrow Wy\_i^T \cdot \left( \int_0^1 Hd\_m(tc\_i) dtc\_i \right) \cdot \uparrow Wy\_i$$

$$= T\_i \cdot \uparrow Wy\_i^T \cdot H\_m(T\_i) \cdot \uparrow Wy\_i$$

where $$H\_m(T\_i) = \int_0^1 Hd\_m(tc\_i) dtc\_i \text{ (: square matrix of order } (n+1))$$

Here, as apparent from the proviso of the expression (15), that of the expressions (16a) and (16b), and that of the expressions (17a) and (17b), $H\_m(T\_i)$ is a matrix whose components each become zero or a constant value according to the time width $T\_i$ of the section i.

Further, the ZMP square acceleration $(\uparrow Azmp\_i(t))^2$ at a given time is a total $(=(Axzmp\_i(t))^2+(Ayzmp\_i(t))^2)$ of the component $(Axzmp\_i(t))^2$ in the X-axis direction and the component $(Ayzmp\_i(t))^2$ in the Y-axis direction of the ZMP acceleration.

Therefore, an integral F (from time $t\_0$ to time $t\_e+1$) of the ZMP square acceleration $(\uparrow Azmp(t))^2$ in the entire trajectory generation object period is expressed by the following expression (18).

$$F = \int_{t\_0}^{t\_e+1} (\uparrow Azmp(t))^2 dt = \int_{t\_0}^{t\_e+1} ((Axzmp(t))^2 + (Ayzmp(t))^2) dt \quad (18)$$

$$= \sum_{i=0}^{e} T\_i \cdot \uparrow Wx\_i^T \cdot H\_m(T\_i) \cdot \uparrow Wx\_i +$$

$$\sum_{i=0}^{e} T\_i \cdot \uparrow Wy\_i^T \cdot H\_m(T\_i) \cdot \uparrow Wy\_i$$

$$= \uparrow W^T \cdot Hh\_m \cdot \uparrow W$$

where $$\uparrow W = \begin{pmatrix} \uparrow Wx\_0 \\ \uparrow Wx\_1 \\ \vdots \\ \uparrow Wx\_e \\ \uparrow Wy\_0 \\ \uparrow Wy\_1 \\ \vdots \\ \uparrow Wy\_e \end{pmatrix}$$

$$Hh\_m = \begin{pmatrix} Hs\_m & 0h \\ 0h & Hs\_m \end{pmatrix}$$

$$Hs\_m = \begin{pmatrix} T\_0 \cdot H\_m(T\_0) & 0s & 0s & \cdots & 0s \\ 0s & T\_1 \cdot H\_m(T\_1) & 0s & \cdots & 0s \\ 0s & 0s & \ddots & & \vdots \\ \vdots & \vdots & & \ddots & 0s \\ 0s & 0s & & \cdots & 0s \; T\_e \cdot H\_m(T\_e) \end{pmatrix}$$

0 h: zero matrix of order $(e+1) \cdot (n+1)$ 0 s: zero matrix of order $(n+1)$

It should be noted that $\uparrow W$ represents a vector composed of $2 \cdot (e+1) \cdot (n+1)$ components (which corresponds to the vector $\uparrow W$ explained supplementally regarding the linear equalities expressing the divergence component condition), Hh_m represents a square matrix of order $2 \cdot (e+1) \cdot (n+1)$, and Hs_m represents a square matrix of order $(e+1) \cdot (n+1)$.

As such, the integral F of the ZMP square acceleration $(\uparrow Azmp(t))^2$ defined by the expression (18) becomes a quadratic function (about Wx_ij, Wy_ij) which includes, as variables, square values of $2 \cdot (e+1) \cdot (n+1)$ coefficients Wx_ij, Wy_ij (i=0, 1, . . . , e; j=0, 1, . . . , n) included in the desired coefficient group when the trajectory of each component of the desired ZMP vector ↑Pzmp is expressed by a polynomial function.

Thus, in the present embodiment, the desired ZMP trajectory generating unit 53 sets the integral F of the ZMP square acceleration $(\uparrow Azmp(t))^2$ defined by the above expression (18), as an evaluation function F (objective function) in a quadratic programming problem.

In this case, the value of each component of the matrix Hs_m in the evaluation function F is calculated using the set value of the time width T_i of each section i (i=0, 1, . . . , e) of the trajectory generation object period.

In the above-described manner, the desired ZMP trajectory generating unit 53 sets the linear equalities that express the divergence component condition (stabilization condition), the passing point condition, and the trajectory connection condition, the linear inequalities that express the ZMP existence permissible region condition, and the quadratic evaluation function F.

The desired ZMP trajectory generating unit 53 then uses the evaluation function F, the linear equalities, and the linear inequalities to carry out the processing in the polynomial function coefficient group determining unit 53a, to thereby determine the desired coefficient group composed of the desired values of the coefficients Wx_ij, Wy_ij (i= 0, 1, . . . , e; j=0, 1, . . . , n) of the polynomial functions expressing the trajectory of the desired ZMP vector.

In this case, the polynomial function coefficient group determining unit 53a uses the linear equalities and linear inequalities described above as the constraint conditions regarding the values of the coefficients Wx_ij, Wy_ij to carry out the processing of determining the desired coefficient group, by a known algorithm of a solution method for a quadratic programming problem, in such a way as to minimize the value of the evaluation function F. For this algorithm, an interior point method or an active set method, for example, may be used.

Accordingly, the polynomial functions that express, as function of time, the trajectories of the desired ZMP vector ↑Pzmp (trajectories of the position Xzmp in the X-axis direction and the position Yzmp in the Y-axis direction of the desired ZMP) in the respective ones of all the sections i (i=0, 1, . . . , e) in the trajectory generation object period are determined.

The above has described the details of the processing performed by the desired ZMP trajectory generating unit 53 in the present embodiment.

According to the present embodiment described above, with a desired ZMP trajectory being expressed by a polynomial function, a plurality of constraint conditions (specifically, the above-described stabilization condition, passing point condition, trajectory connection condition, and ZMP existence permissible region condition) regarding the desired ZMP trajectory can be expressed by linear equalities or linear inequalities about the coefficients Wx_ij, Wy_ij (i=0, 1, . . . , e; j=0, 1, . . . , n) in the polynomial function.

Further, with an integral of a square value (ZMP square acceleration) of the ZMP acceleration ↑Azmp, for example, being used as an evaluation function F, the evaluation function F can be expressed as a quadratic function regarding the coefficients Wx_ij, Wy_ij (i=0, 1, . . . , e; j=0, 1, . . . , n) in the polynomial function expressing the desired ZMP trajectory.

It is therefore possible to determine a desired coefficient group for a polynomial function, by an algorithm of a solution method for a quadratic programming problem, in such a way as to minimize the value of the evaluation function while fulfilling a plurality of constraint conditions expressed by the linear equalities and linear inequalities. Accordingly, the desired ZMP trajectory that may fulfill all the constraint conditions can be generated efficiently.

Further, the desired ZMP trajectory that may fulfill the constraint conditions can be generated in a smooth curved shape by a polynomial function. The trajectory generation object period is divided into a plurality of sections i and the desired ZMP trajectory in a respective section i is expressed by a polynomial function specific to that section i. It is therefore possible to generate a desired ZMP trajectory with a high degree of freedom so as to be able to widely use the region of the supporting polygon.

This leads to an increased degree of freedom of the desired gait that the desired gait generating unit 42 may generate, so a desired gait that may meet a variety of operation requests for the robot 1 can be generated appropriately.

Further, in the present embodiment, a desired ZMP trajectory which is smooth and unlikely to make an abrupt change of the desired ZMP can be generated by using, as the evaluation function F, an integral of the square value (ZMP square acceleration) of the ZMP acceleration ↑Azmp. Consequently, a desired gait that enables smooth movement operation of the robot 1 can be generated.

In the present embodiment, a polynomial function in each section i is expressed as a function of normalized time tc_i obtained by normalizing the time in each section i. This can simplify the derivation of the trajectory connection condition, among the constraint conditions regarding the desired ZMP trajectory particularly.

Inventive examples of the desired ZMP trajectory generated by the present embodiment will now be described with reference to FIGS. 8 and 9.

Figure 8:
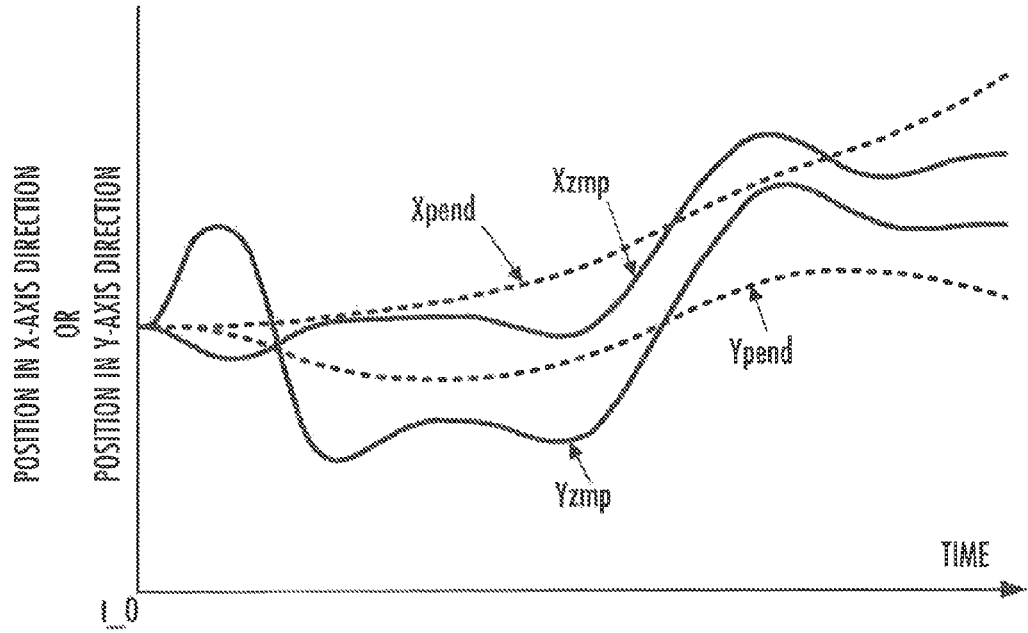
FIG. 8 is a graph showing desired ZMP trajectories and desired center-of-gravity trajectories in the Example.

FIG. 8 shows, in solid line graphs, inventive examples of the desired ZMP trajectories (trajectory of the position Xzmp in the X-axis direction and trajectory of the position Yzmp in the Y-axis direction) which are generated by the desired ZMP trajectory generating unit 53 when generating a desired gait in which the robot 1 starts walking from the state (at time t_0) of standing upright with the feet 18R and 18L arranged side by side in the lateral direction.

The broken line graphs in FIG. 8 indicate inventive examples of the desired center-of-gravity trajectories (trajectory of the position Xpend in the X-axis direction and trajectory of the position Ypend in the Y-axis direction) of the robot 1 which are generated by the desired center-of-gravity trajectory generating unit 54 using the desired ZMP trajectories shown by the solid lines.

As evident from the figure, it is understood that a desired ZMP trajectory can be generated in a smooth curved shape according to the present embodiment. It is also understood that a desired center-of-gravity trajectory of the robot 1 can be generated as a smooth trajectory so as to prevent the position (on the XY coordinate plane) of the center of gravity of the robot 1 (inverted pendulum mass point 60) from deviating largely from the position (on the XY coordinate plane) of the desired ZMP.

Figure 9:
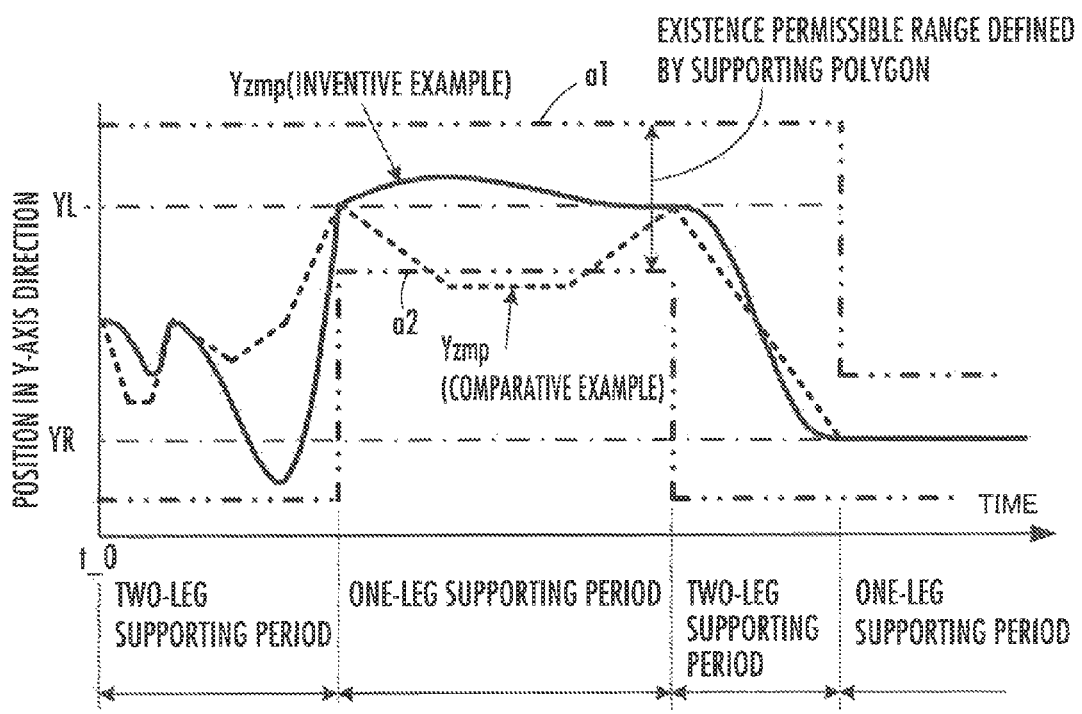
FIG. 9 is a graph showing trajectories of the positions in the Y-axis direction of desired ZMPs in the Example and in a Comparative Example.

FIG. 9 shows, in a solid line graph, an inventive example of the trajectory of the position Yzmp in the Y-axis direction of the desired ZMP which is generated by the desired ZMP trajectory generating unit 53 when the robot 1 performs walking in which the robot 1 starts moving a free leg's foot 18L in the air quickly (in a pre-operation of 0.1 seconds) from the state (at time t_0) of standing upright with the feet 18R and 18L arranged side by side in the lateral direction (Y-axis direction).

The broken line graph in FIG. 9 indicates a trajectory of the position Yzmp in the Y-axis direction of a desired ZMP in a comparative example. This comparative example shows a desired ZMP trajectory in the form of a polygonal line which is generated by correcting a reference desired ZMP trajectory with a trapezoidal correction pattern, as described in Patent Literature 1. In this comparative example, the existence position of the desired ZMP is not restricted by a supporting polygon.

It should be noted that YL and YR in FIG. 9 show the positions in the Y-axis direction of the respective feet 18L and 18R (central positions in the width direction of the feet 18) in a one-leg supporting period. The range between the double dot-dash lines a1 and a2 in FIG. 9 shows, by way of example, the existence permissible range of the position in the Y-axis direction of the desired ZMP defined by a supporting polygon.

In the comparative example shown in FIG. 9, the trajectory of the position Yzmp in the Y-axis direction of the desired ZMP in the first one-leg supporting period (in which the foot 18L is in contact with the floor) is relatively largely displaced in the Y-axis direction with respect to the position YL of the foot 18L. Thus, the position Yzmp in the Y-axis direction of the desired ZMP may go off the edge of the supporting polygon defined by the floor-contacting surface of the foot 18L.

In contrast, in the inventive example shown in FIG. 9, the trajectory of the position Yzmp in the Y-axis direction of the desired ZMP is generated such that the position Yzmp is displaced relatively largely in the two-leg supporting period at the beginning of the walking operation, and thus, the trajectory of the position Yzmp in the Y-axis direction of the desired ZMP in the first one-leg supporting period is generated so as to be displaced only a small amount in the Y-axis direction with respect to the position YL of the foot 18L. This ensures that the position Yzmp in the Y-axis direction of the desired ZMP is kept within the supporting polygon defined by the floor-contacting surface of the foot 18L (i.e. the aforesaid ZMP existence permissible region condition is fulfilled). It should be noted that the supporting polygon in a two-leg supporting period is wide in the Y-axis direction, so the position Yzmp in the Y-axis direction of the desired ZMP will not go off the edge thereof even during the two-leg supporting period at the beginning of the walking operation (i.e. the ZMP existence permissible region condition is fulfilled).

Therefore, according to the present embodiment, a desired ZMP trajectory that fulfills the ZMP existence permissible region condition can be generated appropriately.

It should be noted that the present invention is not limited to the embodiment described above; other embodiments may be adopted as well. Several modifications will be described below.

In the above embodiment, the description was made by giving as an example the case where the robot 1 is caused to travel in a biped gait. The present invention, however, is also applicable in the case where the robot 1 travels in a quadruped gait by using the hands 30R, 30L of the arm link mechanisms 4R, 4L as the moving/landing portions, in addition to the feet 18R, 18L of the leg link mechanisms 3R, 3L.

Further, the mobile robot in the present invention is not limited to a robot 1 having two leg link mechanisms 3R, 3L; it may be a robot having three or more leg link mechanisms.

Further, in the above embodiment, the stabilization condition, passing point condition, trajectory connection condition, and ZMP existence permissible region condition were used as the constraint conditions regarding the desired ZMP trajectory. However, some of the conditions may be omitted, or one or more constraint conditions may further be added.

For example, the passing point condition may be omitted. Further, the trajectory connection condition is unnecessary in the case where the trajectory generation object period is not divided into a plurality of sections i.

Further, in the above embodiment, an integral of the ZMP square acceleration was used as the evaluation function F. The evaluation function, however, is not limited thereto; another evaluation function may be used as long as it can be expressed as a quadratic function about the coefficients in a polynomial function expressing the desired ZMP trajectory. For example, an integral of a moving velocity of the desired ZMP can be used as an evaluation function.

Further, in the above embodiment, a polynomial function of order 7 (n=7) was used as the polynomial function expressing the desired ZMP trajectory. The order n of the polynomial function, however, is not limited to "7"; it may be "10" or other order.

It should be noted that the order n of the polynomial function is preferably "5" or higher in the case where the constraint conditions regarding the position, moving velocity, and moving acceleration of the desired ZMP are used as the trajectory connection condition.

What is claimed is:

1. A desired ZMP trajectory generating device for a mobile robot which generates a desired ZMP trajectory as a trajectory of a desired position of a zero moment point (ZMP) of the mobile robot, the device comprising:

a polynomial function coefficient group determining section which determines, by regarding the desired ZMP trajectory as a trajectory expressed by a polynomial function of degree 2 or higher with time as a variable, a desired coefficient group comprising desired values of coefficients in respective terms of the polynomial function, wherein the polynomial function coefficient group determining section is configured to use a quadratic evaluation function configured to include square values of the coefficients included in the desired coefficient group as variables and a plurality of constraint conditions each configured by a linear equality or linear inequality about the coefficients, to determine the desired coefficient group, so as to minimize a value of the evaluation function while fulfilling the constraint conditions by a solution method for a quadratic programming problem, and the constraint conditions are configured to include a linear inequality which expresses a first constraint condition that a desired position of the ZMP at one or more sampling time in the desired ZMP trajectory exists within a predetermined polygonal region set in accordance with a desired position and desired posture of a floor-contacting site of the mobile robot at the sampling time.

2. The desired ZMP trajectory generating device for a mobile robot according to claim 1, wherein the constraint conditions are configured to further include a linear equality which expresses, as a condition for keeping in a stable state an inverted pendulum mass point in a model that expresses a motion of a center of gravity of the mobile robot by a motion of the inverted pendulum mass point having a mass point at the center of gravity of the mobile robot and having a ZMP on the desired ZMP trajectory as a fulcrum, a second constraint condition that a motional state of the inverted pendulum mass point at a predetermined time in future agrees with a predetermined motional state.

3. The desired ZMP trajectory generating device for a mobile robot according to claim 2, wherein the motional state of the inverted pendulum mass point at the predetermined time in the future is a motional state expressed by a linear combination of a position and a moving velocity of the inverted pendulum mass point.

4. The desired ZMP trajectory generating device for a mobile robot according to claim 1, wherein the constraint conditions are configured to further include a linear equality which expresses a third constraint condition that a desired position of the ZMP at a predetermined time on the desired ZMP trajectory agrees with a predetermined position.

5. The desired ZMP trajectory generating device for a mobile robot according to claim 1, wherein
the desired ZMP trajectory is a trajectory which is divided into a plurality of sections of trajectory and expressed by polynomial functions specific to the respective sections, and
the desired coefficient group determined by the polynomial function coefficient group determining section comprises desired values of coefficients in respective terms of the polynomial functions for all of the plurality of sections.

6. The desired ZMP trajectory generating device for a mobile robot according to claim 5, wherein the constraint conditions are configured to further include a linear equality which expresses a fourth constraint condition that, of two arbitrary sections adjacent to each other among the plurality of sections, a position of the ZMP at an ending time of a preceding section defined by the polynomial function for the preceding section and a differential value of a predetermined order of the position of the ZMP agree with a position of the ZMP at a starting time of a succeeding section defined by the polynomial function for the succeeding section and a differential value of the predetermined order of the position of the ZMP, respectively.

7. The desired ZMP trajectory generating device for a mobile robot according to claim 5, wherein the polynomial function for a respective one of the plurality of sections is a polynomial function which is expressed as a function of time obtained by normalizing the time in the corresponding section by regarding a time width of the section as a predetermined constant value and by regarding a starting time of the section as zero.

8. The desired ZMP trajectory generating device for a mobile robot according to claim 1, wherein the evaluation function is a function which expresses an integral of a square value of a moving acceleration of the ZMP in the desired ZMP trajectory.

* * * * *